United States Patent
Zhu et al.

(10) Patent No.: US 11,778,363 B2
(45) Date of Patent: Oct. 3, 2023

(54) AUDIO DATA TRANSMISSION METHOD APPLIED TO SWITCHING BETWEEN SINGLE-EARBUD MODE AND DOUBLE-EARBUD MODE OF TWS HEADSET AND DEVICE

(71) Applicant: Huawei Technologies Co., Ltd., Shenzhen (CN)

(72) Inventors: Yuhong Zhu, Shanghai (CN); Liang Wang, Shanghai (CN); Yong Zheng, Shanghai (CN); Jingyun Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

(21) Appl. No.: 17/417,700

(22) PCT Filed: Dec. 24, 2018

(86) PCT No.: PCT/CN2018/123243
§ 371 (c)(1),
(2) Date: Jun. 23, 2021

(87) PCT Pub. No.: WO2020/132839
PCT Pub. Date: Jul. 2, 2020

(65) Prior Publication Data
US 2022/0078541 A1   Mar. 10, 2022

(51) Int. Cl.
*H04R 5/02* (2006.01)
*H04R 1/10* (2006.01)
*H04S 1/00* (2006.01)

(52) U.S. Cl.
CPC ........... *H04R 1/1041* (2013.01); *H04S 1/005* (2013.01); *H04R 2420/07* (2013.01)

(58) Field of Classification Search
CPC .............................. H04R 1/1041; H04S 1/005
See application file for complete search history.

(56) References Cited

U.S. PATENT DOCUMENTS

| | | |
|---|---|---|
| 2009/0089813 A1 | 4/2009 | Wihardja et al. |
| 2012/0033620 A1 | 2/2012 | Thoen et al. |

(Continued)

FOREIGN PATENT DOCUMENTS

| | | |
|---|---|---|
| CN | 102113346 A | 6/2011 |
| CN | 102187690 A | 9/2011 |

(Continued)

OTHER PUBLICATIONS

Woolley, "Bluetooth Core Specification Version 5.2 Feature Overview," Version: 1.0.1, total 37 pages (Dec. 9, 2020).

*Primary Examiner* — Simon King
(74) *Attorney, Agent, or Firm* — Leydig, Voit & Mayer, Ltd.

(57) ABSTRACT

An audio data transmission method. An electronic device transmits audio data to a first earbud of a TWS headset by using a first CIS of a first CIG, and transmits audio data to a second earbud of the TWS headset by using a second CIS of the first CIG. The electronic device determines that the TWS headset is switched from a double-earbud mode (namely, a mode in which the first earbud and the second earbud are used together as audio input/output devices of the electronic device) to a first single-earbud mode (namely, a mode in which the first earbud is independently used as an audio input/output device of the electronic device). In response to the determining, the electronic device deactivates the second CIS, stops transmitting audio data to the second earbud by using the second CIS, and continues transmitting audio data to the first earbud by using the first CIS.

20 Claims, 15 Drawing Sheets

(56) References Cited

U.S. PATENT DOCUMENTS

| | | | |
|---|---|---|---|
| 2012/0058727 A1 | 3/2012 | Cook et al. | |
| 2015/0334488 A1 | 11/2015 | Kim et al. | |
| 2017/0244576 A1 | 8/2017 | Batra et al. | |
| 2017/0251469 A1* | 8/2017 | Lee | H04W 72/0446 |
| 2017/0272851 A1 | 9/2017 | Kim et al. | |
| 2017/0295284 A1* | 10/2017 | Song | H04L 65/1069 |
| 2017/0303076 A1* | 10/2017 | Song | H04L 1/1607 |
| 2019/0045304 A1* | 2/2019 | Bhalla | H04R 3/12 |
| 2019/0215673 A1* | 7/2019 | Choi | H04L 47/20 |
| 2019/0215879 A1* | 7/2019 | Song | G10L 15/22 |
| 2022/0039041 A1* | 2/2022 | Zhu | H04R 5/033 |

FOREIGN PATENT DOCUMENTS

| | | |
|---|---|---|
| CN | 103517196 A | 1/2014 |
| CN | 104335642 A | 2/2015 |
| CN | 105284134 A | 1/2016 |
| CN | 105491469 A | 4/2016 |
| CN | 106797518 A | 5/2017 |
| CN | 107277668 A | 10/2017 |
| CN | 107894881 A | 4/2018 |
| CN | 108696784 A | 10/2018 |
| CN | 108702720 A | 10/2018 |
| CN | 108718467 A | 10/2018 |

* cited by examiner (a)

(b)

AUDIO DATA TRANSMISSION METHOD APPLIED TO SWITCHING BETWEEN SINGLE-EARBUD MODE AND DOUBLE-EARBUD MODE OF TWS HEADSET AND DEVICE

CROSS REFERENCE TO RELATED APPLICATIONS

This application is a national stage of International Application No. PCT/CN2018/123243, filed on Dec. 24, 2018, which is hereby incorporated by reference in its entirety.

TECHNICAL FIELD

Embodiments of this application relate to the field of short-range communications technologies, and in particular, to an audio data transmission method and an electronic device.

BACKGROUND

A source device may transmit audio data (an audio stream or a stream) to one or more destination devices through a Bluetooth low energy (BLE) isochronous (ISO) channel. For example, a mobile phone may transmit audio data to left and right earbuds of a true wireless stereo (TWS) headset through the BLE ISO channel. The TWS headset includes two main bodies. For example, the two main bodies are referred to as the left earbud and the right earbud, and no cable is required to connect the left earbud and the right earbud.

The left earbud and the right earbud of the TWS headset may be used as audio input/output devices of a mobile phone, and are used together (this is referred to as a double-earbud mode) to implement a function such as music playing or voice communication. In the double-earbud mode, play-level synchronization of audio data needs to be implemented, in other words, the left and right earbuds need to play received audio data at the same time.

Certainly, either of the left earbud and the right earbud of the TWS headset may be used as an audio input/output device of a mobile phone, and is independently used (this is referred to as a single-earbud mode) to implement a function such as music playing or voice communication. In the single-earbud mode, play-level synchronization of audio data does not need to be implemented.

In the single-earbud mode and the double-earbud mode, requirements for synchronously playing audio data by the left earbud and the right earbud are different. Therefore, in the single-earbud mode and the double-earbud mode, the mobile phone have different ISO channel configurations. When the TWS headset is switched between the single-earbud mode and the double-earbud mode (for example, switched from the single-earbud mode to the double-earbud mode, or switched from the double-earbud mode to the single-earbud mode), the mobile phone needs to reconfigure an ISO channel.

However, if switching between the single-earbud mode and the double-earbud mode occurs in a music playing or voice communication process, reconfiguring the ISO channel by the mobile phone causes interruption to audio data. Consequently, user experience is affected.

SUMMARY

Embodiments of this application provide an audio data transmission method and an electronic device, to ensure normal audio data transmission during switching between a single-earbud mode and a double-earbud mode.

According to a first aspect, an embodiment of this application provides an audio data transmission method. During CIS configuration for earbuds of a TWS headset, regardless of whether the TWS headset is in a single-earbud mode or a double-earbud mode, an electronic device may configure, for the TWS headset, a first connected isochronous group (CIG) including two connected isochronous streams (CIS) (for example, a first CIS and a second CIS). In this case, in the double-earbud mode, the electronic device may activate the two CISs, and then transmit audio data to left and right earbuds of the TWS headset by using the two CISs; and in the single-earbud mode, the electronic device may activate only one CIS, and transmit audio data to a corresponding earbud by using the CIS. If switching between the single-earbud mode and the double-earbud mode occurs in a music playing or voice communication process, the electronic device does not need to reconfigure a CIS, but only need to activate or deactivate a corresponding CIS. In this way, audio data transmission is not interrupted, normal audio data transmission can be ensured, and user experience can be improved.

With reference to the first aspect, in a possible design manner, in the double-earbud mode, the electronic device may activate the first CIS and the second CIS, transmit audio data to a first earbud by using the first CIS, and transmit audio data to a second earbud by using the second CIS. When the TWS headset is switched from the double-earbud mode to the single-earbud mode, the electronic device may deactivate one CIS, and continue transmitting audio data to a corresponding earbud by using the other CIS.

With reference to the first aspect, in a possible design manner, in the single-earbud mode, the electronic device activates only one CIS (for example, the first CIS), and transmit audio data to a corresponding earbud (for example, the first earbud) by using the activated CIS. In this case, the electronic device does not activate the other CIS (for example, the second CIS). When the TWS headset 101 is switched from the single-earbud mode to the double-earbud mode, the electronic device 100 may activate the other CIS, and transmit audio data to the two earbuds by using the two CISs.

With reference to the first aspect, in a possible design manner, when the electronic device configures the first CIG, the electronic device configures a sequential (Sequential) scheduling transmission manner or an interleaved (Interleaved) scheduling transmission manner for the first CIS and the second CIS. In the sequential scheduling transmission manner and the interleaved scheduling transmission manner, CIG parameters configured for the first CIG are different.

With reference to the first aspect, in a possible design manner, in the double-earbud mode, the interleaved scheduling transmission manner is configured for the first CIS and the second CIS. In the interleaved scheduling transmission manner, an anchor point of the first CIS is a CIG anchor point of the first CIG, an anchor point of the second CIS is the same as an end point of the first subevent in a CIS event of the first CIS, and a start point of the second subevent of the first CIS is an end point of the first subevent of the second CIS.

The first CIS and the second CIS each include a plurality of CIS events. The first CIG includes a plurality of CIG events, and each CIG event includes one CIS event of the first CIS and one CIS event of the second CIS. Each CIS event of the first CIS includes N1 subevents, where N1 is greater than or equal to 2. Each CIS event of the second CIS includes N2 subevents, where N2 is greater than or equal to 2.

The electronic device starts to transmit audio data to the first earbud from the anchor point of the first CIS by using the first CIS, and the electronic device starts to transmit audio data to the second earbud from the anchor point of the second CIS by using the second CIS.

Certainly, in the double-earbud mode, the sequential scheduling transmission manner is alternatively configured for the first CIS and the second CIS. For detailed descriptions of the sequential scheduling transmission manner, refer to descriptions in other parts in embodiments of this application. Details are not described herein.

In the double-earbud mode, in comparison with the sequential scheduling transmission manner, an advantage of the interleaved scheduling transmission manner lies in: The electronic device may interleave subevents of the first CIS with subevents of the second CIS in terms of time. In other words, the electronic device may interleave, in terms of time, audio data transmission by using the first CIS with audio data transmission by using the second CIS. In this way, interference caused to different CISs can be more even, and anti-interference performance in audio data transmission can be improved.

With reference to the first aspect, in a possible design manner, in the single-earbud mode, the sequential scheduling transmission manner is configured for the first CIS and the second CIS. In the sequential scheduling transmission manner, an anchor point of the first CIS is a CIG anchor point of the first CIG, and an anchor point of the second CIS is the same as an end point of a CIS event of the first CIS.

Certainly, in the single-earbud mode, the interleaved scheduling transmission manner is alternatively configured for the first CIS and the second CIS. For specific descriptions of the interleaved scheduling transmission manner, refer to descriptions in other parts in embodiments of this application. Details are not described herein.

In the single-earbud mode, in comparison with the interleaved scheduling transmission manner, an advantage of the sequential scheduling transmission manner lies in: The electronic device may transmit audio data to one earbud (for example, the first earbud) in continuous time (for example, all subevents in one CIS event of the first CIS are continuous in time). In this way, interference caused to a CIS can be reduced, and anti-interference performance in audio data transmission can be improved.

In addition, in the single-earbud mode, when the sequential scheduling transmission manner is used, a relatively long continuous idle time may be reserved for other transmission (for example, wireless fidelity (Wi-Fi)). In this way, mutual interference caused by transmission resources used when frequent switching between Wi-Fi and Bluetooth occurs can be reduced.

Optionally, when the electronic device configures the first CIG, the electronic device configures a joint scheduling transmission manner for the first CIS and the second CIS. In the double-earbud mode, when the joint scheduling transmission manner is used, a problem that the electronic device may separately transmit same audio data to the left and right earbuds of the TWS headset in different time in the foregoing sequential scheduling or interleaved scheduling transmission manner can be avoided, wastes of transmission resources can be reduced, and effective transmission resource utilization can be improved.

In the joint scheduling transmission manner, an anchor point of the first CIS is a CIG anchor point of the first CIG, and an anchor point of the second CIS is also the CIG anchor point of the first CIG. The first CIG includes a plurality of CIG events, and the CIG anchor point of the first CIG is a start time point of a CIG event.

According to a second aspect, an embodiment of this application provides an audio data transmission method. The audio data transmission method may be used for audio data transmission between an electronic device and a TWS headset. The TWS headset includes a first earbud and a second earbud. The electronic device may transmit audio data to the first earbud by using a first CIS of a first CIG, and transmit audio data to the second earbud by using a second CIS of the first CIG. In this case, the TWS headset is in a double-earbud mode, namely, a mode in which the first earbud and the second earbud are used together as audio input/output devices of the electronic device. If the TWS headset is switched from the double-earbud mode to a first single-earbud mode, the electronic device may deactivate the second CIS, stop transmitting audio data to the second earbud by using the second CIS, and continue transmitting audio data to the first earbud by using the first CIS. The first single-earbud mode is a mode in which the first earbud is independently used as an audio input/output device of the electronic device.

Certainly, when the TWS headset is in the double-earbud mode, the TWS headset may alternatively be switched from the double-earbud mode to a second single-earbud mode. The second single-earbud mode is a mode in which the second earbud is independently used as an audio input/output device of the electronic device. In this case, the electronic device may deactivate the first CIS, stop transmitting audio data to the first earbud by using the first CIS, and continue transmitting audio data to the second earbud by using the second CIS.

In this embodiment of this application, when the TWS headset is switched from the double-earbud mode to a single-earbud mode (for example, the first single-earbud mode), the electronic device may deactivate a CIS (for example, the second CIS) corresponding to an earbud that is not used, instead of reconfiguring a CIS. In this way, audio data transmission is not interrupted, normal audio data transmission can be ensured, and user experience can be improved.

With reference to the second aspect, in a possible design manner, after deactivating the second CIS, the electronic device stops transmitting audio data to the second earbud by using the second CIS, and continues transmitting audio data to the first earbud by using the first CIS. In other words, after the TWS headset is switched from the double-earbud mode to the first single-earbud mode, the TWS headset may be further re-switched from the first single-earbud mode to the double-earbud mode. Specifically, the method in this embodiment of this application may further include: The electronic device determines that the TWS headset is switched from the first single-earbud mode to the double-earbud mode. In response to determining that the TWS headset is switched from the first single-earbud mode to the double-earbud mode, the electronic device continues transmitting audio data to the first earbud by using the first CIS, activates the second CIS, and transmits audio data to the second earbud by using the second CIS.

In other words, the electronic device configures two CISs for the TWS headset. When the TWS headset is switched from the single-earbud mode (for example, the first single-earbud mode) to the double-earbud mode, the electronic device only needs to activate a CIS (for example, the second CIS) corresponding to an earbud that is not used. In this way, audio data transmission is not interrupted, normal audio data transmission can be ensured, and user experience can be improved.

With reference to the second aspect, in another possible design manner, before transmitting audio data to the first earbud by using the first CIS of the first CIG, the electronic device may determine that the TWS headset is in the double-earbud mode, configure the first CIG including the first CIS and the second CIS for the TWS headset, configure the first CIS for the first earbud, configure the second CIS for the second earbud, and activate the first CIS and the second CIS. Even if the TWS headset is switched from the double-earbud mode to the single-earbud mode, the electronic device only needs to deactivate a corresponding CIS. In this way, audio data transmission is not interrupted, normal audio data transmission can be ensured, and user experience can be improved.

With reference to the second aspect, in another possible design manner, when the TWS headset is in the double-earbud mode, and the electronic device configures the first CIG, the electronic device configures an interleaved scheduling transmission manner for the first CIS and the second CIS. In the interleaved scheduling transmission manner, an anchor point of the first CIS is a CIG anchor point of the first CIG, an anchor point of the second CIS is the same as an end point of the first subevent in a CIS event of the first CIS, and a start point of the second subevent of the first CIS is an end point of the first subevent of the second CIS. In the double-earbud mode, in comparison with a sequential scheduling transmission manner, for an advantage of the interleaved scheduling transmission manner, refer to the descriptions in the possible design manners of the first aspect. Details are not described in this embodiment of this application again.

With reference to the second aspect, in another possible design manner, when the TWS headset is in the double-earbud mode, and the electronic device configures the first CIG, the electronic device configures a joint scheduling transmission manner for the first CIS and the second CIS. In the joint scheduling transmission manner, an anchor point of the first CIS is a CIG anchor point of the first CIG, and an anchor point of the second CIS is also a CIG anchor point of the first CIG. In the double-earbud mode, for an advantage of the joint scheduling transmission manner, refer to the descriptions in the possible design manners of the first aspect. Details are not described in this embodiment of this application again.

With reference to the second aspect, in another possible design manner, after the electronic device determines that the TWS headset is switched from the double-earbud mode to the first single-earbud mode, the electronic device may receive a suspending operation of a user. The suspending operation is used to trigger the TWS headset to temporarily stop playing audio data. After the TWS headset is switched from the double-earbud mode to the single-earbud mode, to avoid a problem that a CIS transmission manner configured by the electronic device for an earbud is not suitable in the single-earbud mode, in response to the suspending operation, the electronic device may re-determine a current mode (for example, the first single-earbud mode) of the TWS headset, and then reconfigure a first CIG for the TWS headset. The reconfigured first CIG includes a reconfigured first CIS and a reconfigured second CIS.

The reconfigured first CIS and the reconfigured second CIS are suitable for the mode to which the TWS headset is switched, for example, the first single-earbud mode. For example, a sequential scheduling transmission manner may be configured for the reconfigured first CIS and the reconfigured second CIS. For detailed descriptions of the sequential scheduling transmission manner, refer to descriptions in other parts in embodiments of this application. Details are not described herein.

In addition, the electronic device may configure the reconfigured first CIS for the first earbud, activate the reconfigured first CIS, and start to transmit audio data to the first earbud from an anchor point of the reconfigured first CIS by using the reconfigured first CIS. The reconfigured second CIS is not activated in the first single-earbud mode.

It may be understood that, in response to the suspending operation, the audio data is suspended (namely, stopped). The electronic device reconfigures a CSI in an audio data suspending process. In this way, after a service is restarted, the electronic device can transmit the audio data by using the reconfigured CIS, and the service is not interrupted due to reconfiguration of the CIS.

According to a third aspect, an embodiment of this application provides an audio data transmission method. The audio data transmission method may be used for audio data transmission between an electronic device and a TWS headset. The TWS headset includes a first earbud and a second earbud. When determining that the TWS headset is in a first single-earbud mode, the electronic device may configure a first CIG including a first CIS and a second CIS for the first earbud. The first single-earbud mode is a mode in which the first earbud is independently used as an audio input/output device of the electronic device. The electronic device may configure the first CIS for the first earbud, activate the first CIS, and transmit audio data to the first earbud by using the first CIS. The second CIS is in an inactive state in the first single-earbud mode. In other words, the second CIS is not activated in the first single-earbud mode. In other words, when the electronic device determines that the TWS headset is in a single-earbud mode, the electronic device still configures two CISs (the first CIS and the second CIS). However, in the single-earbud mode, only one CIS is activated, and the other CIS is not activated.

In this embodiment of this application, even if the TWS headset is in the single-earbud mode, the electronic device may also configure the first CIG including two CISs (for example, the first CIS and the second CIS) for the TWS headset. In this way, if the TWS headset is switched from the single-earbud mode to a double-earbud mode in a music playing or voice communication process, the electronic device does not need to reconfigure a CIS, but only needs to activate a corresponding CIS (for example, the second CIS). In this way, audio data transmission is not interrupted, normal audio data transmission can be ensured, and user experience can be improved.

With reference to the third aspect, in a possible design manner, the TWS headset may be further re-switched from the first single-earbud mode to the double-earbud mode. Specifically, the method in this embodiment of this application may further include: The electronic device determines that the TWS headset is switched from the first single-earbud mode to the double-earbud mode. In response to determining that the TWS headset is switched from the first single-earbud mode to the double-earbud mode, the electronic device activates the second CIS, transmits audio data to the second earbud by using the second CIS, and continues transmitting audio data to the first earbud by using the first CIS.

In other words, the electronic device configures two CISs for the TWS headset. When the TWS headset is switched from the single-earbud mode (for example, the first single-earbud mode) to the double-earbud mode, the electronic device only needs to activate a CIS (for example, the second CIS) corresponding to an earbud that is not used. In this way, audio data transmission is not interrupted, normal audio data transmission can be ensured, and user experience can be improved.

With reference to the third aspect, in another possible design manner, after the TWS headset is switched from the single-earbud mode (for example, the first single-earbud mode) to the double-earbud mode, the TWS headset may be further re-switched from the double-earbud mode to a second single-earbud mode again. After determining that the TWS headset is switched from the double-earbud mode to the second single-earbud mode, the electronic device may deactivate the first CIS, stop transmitting audio data to the first earbud by using the first CIS, and continue transmitting audio data to the second earbud by using the second CIS.

With reference to the third aspect, in another possible design manner, when the TWS headset is in the single-earbud mode, and the electronic device configures the first CIG, the electronic device configures a sequential scheduling transmission manner for the first CIS and the second CIS. In the sequential scheduling transmission manner, an anchor point of the first CIS is a CIG anchor point of the first CIG, and an anchor point of the second CIS is the same as an end point of a CIS event of the first CIS. For detailed descriptions of the sequential scheduling transmission manner, refer to descriptions in other parts in embodiments of this application. Details are not described herein.

With reference to the third aspect, in another possible design manner, after the electronic device determines that the TWS headset is switched from the single-earbud mode (for example, the first single-earbud mode) to the double-earbud mode, the electronic device may receive a suspending operation of a user. The suspending operation is used to trigger the TWS headset to temporarily stop playing audio data. After the TWS headset is switched from the single-earbud mode to the double-earbud mode, to avoid a problem that a CIS transmission manner configured by the electronic device for an earbud is not suitable in the double-earbud mode, in response to the suspending operation, the electronic device may re-determine a current mode (for example, the double-earbud mode) of the TWS headset, and then re-configure a first CIG for the TWS headset. The reconfigured first CIG includes a reconfigured first CIS and a reconfigured second CIS.

The reconfigured first CIS and the reconfigured second CIS are suitable for the mode to which the TWS headset is switched, for example, the double-earbud mode. For example, an interleaved scheduling transmission manner or a joint scheduling transmission manner may be configured for the reconfigured first CIS and the reconfigured second CIS. For specific descriptions of the interleaved scheduling transmission manner and the joint scheduling transmission manner, refer to descriptions in other parts in the embodiments of this application. Details are not described herein.

According to a fourth aspect, an embodiment of this application provides an electronic device. The electronic device includes one or more processors, a memory, and a wireless communications module. The memory and the wireless communications module are coupled to the one or more processors. The memory is configured to store computer program code, and the computer program code includes computer instructions. When the one or more processors execute the computer instructions, the electronic device performs the audio data transmission method according to any one of the first aspect to the third aspect or the possible implementations of the first aspect to the third aspect.

According to a fifth aspect, a Bluetooth communications system is provided. The Bluetooth communications system may include a TWS headset and the electronic device according to the fourth aspect.

According to a sixth aspect, a computer storage medium is provided, including computer instructions. When the computer instructions are run on an electronic device, the electronic device is enabled to perform the audio data transmission method according to any one of the first aspect to the third aspect or the possible implementations of the first aspect to the third aspect.

According to a seventh aspect, this application provides a computer program product. When the computer program product runs on a computer, the computer is enabled to perform the audio data transmission method according to any one of the first aspect to the third aspect or the possible implementations of the first aspect to the third aspect.

It may be understood that the electronic device described in the fourth aspect, the Bluetooth communications system described in the fifth aspect, the computer storage medium described in the sixth aspect, and the computer program product described in the seventh aspect are all used to perform the foregoing corresponding methods. Therefore, for beneficial effects that can be achieved, refer to the beneficial effects in the foregoing corresponding methods. Details are not described herein again.

DESCRIPTION OF EMBODIMENTS

An embodiment of this application provides an audio data transmission method. The audio data transmission method may be used for audio data (audio stream, stream) transmission between an electronic device (for example, a mobile phone) and a TWS headset.

Before the electronic device transmit audio data to an earbud (one or two earbuds) of the TWS headset, the electronic device may first perform pairing with the earbud, then establish an asynchronous connection-oriented link (ACL), and finally configure an ISO channel for the earbud through the ACL link. The electronic device may configure a CIG for the TWS headset based on a use status (for example, a single-earbud mode or a double-earbud mode) of the TWS headset. That the electronic device configures an ISO channel for the earbud through the ACL link specifically means that the electronic device creates a CIS in the CIG through the ACL link. The CIS is used to transmit audio data between the electronic device and the earbud. The CIS is carried on the ISO channel.

Figure 1:
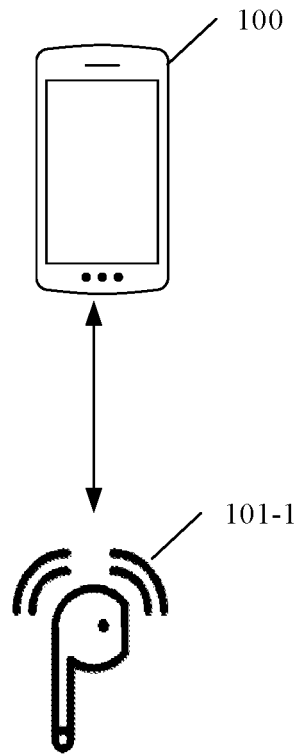
FIG. 1 is a schematic composition diagram of a communications system for transmitting audio data according to an embodiment of this application.
Figure 4:
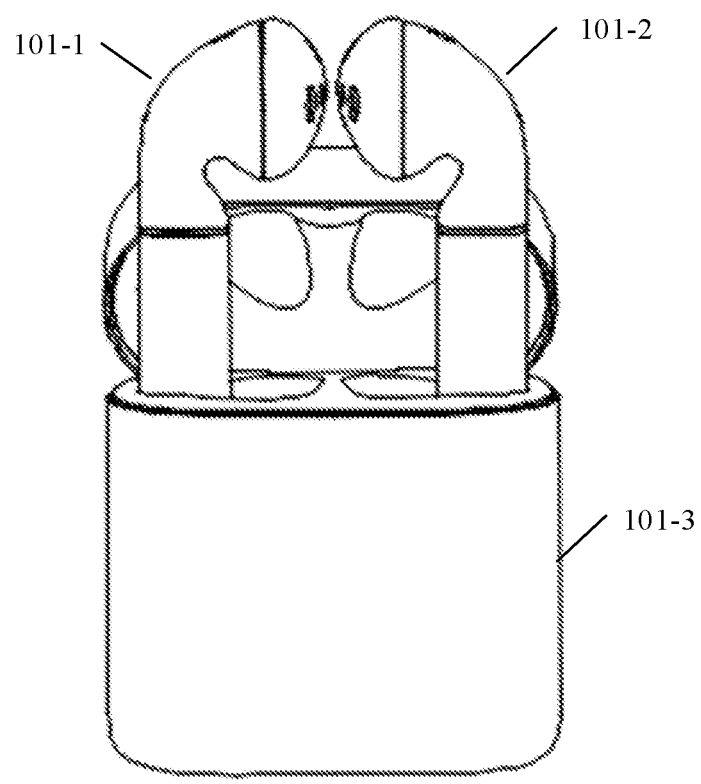
FIG. 4 is a schematic diagram of a product form instance of a TWS headset according to an embodiment of this application.

On the one hand, either of a left earbud and a right earbud of a TWS headset is used as an audio input/output device of an electronic device, and may be independently used (this referred to as a single-earbud mode) to implement a function such as music playing or voice communication. For example, as shown in FIG. 4, a TWS headset 101 includes an earbud 101-1 and an earbud 101-2. As shown in FIG. 1, an earbud 101-1 of a TWS headset 101 is used as an audio input/output device of an electronic device 100 (for example, a mobile phone), and may be independently used to implement a function such as music playing or voice communication.

Figure 2:
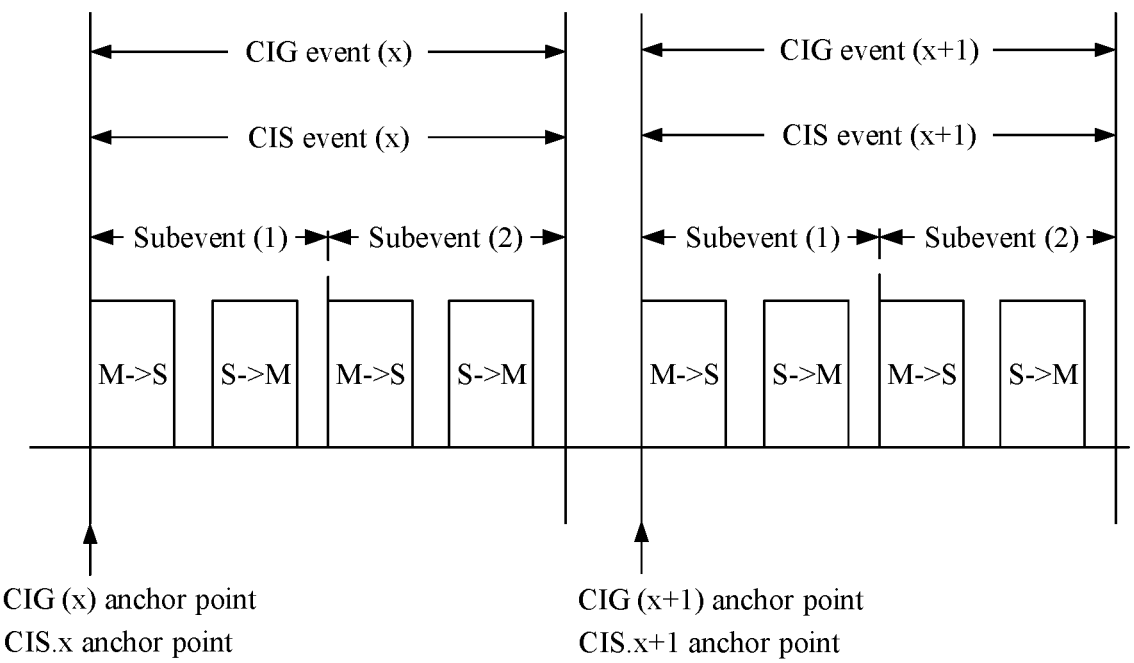
FIG. 2 is a schematic diagram of an audio data transmission principle according to an embodiment of this application.

Generally, in the foregoing single-earbud mode, the electronic device 100 configures a CIG including only one CIS for the TWS headset 101. The electronic device 100 shown in FIG. 1 may establish an ACL link with the earbud 101-1, and create the CIS through the ACL link. The CIS is used to transmit audio data between the electronic device 100 and the earbud 101-1. The CIS is carried on an ISO channel between the electronic device 100 and the earbud 101-1. It should be noted that the CIG includes only one CIS. For example, as shown in FIG. 2, a CIG event (x) includes only one CIS event (x). A CIG event (x+1) includes only one CIS event (x+1).

One CIG includes a plurality of CIG events. Both the CIG event (x) and the CIG event (x+1) are CIG events (CIG event) of the CIG. The electronic device 100 may transmit audio data to the earbud 101-1 by using a plurality of CIG events in one CIG. For example, the electronic device 100 may transmit audio data to the earbud 101-1 by using CIG events such as a CIG event (x) and a CIG event (x+1) in one CIG.

Figure 3:
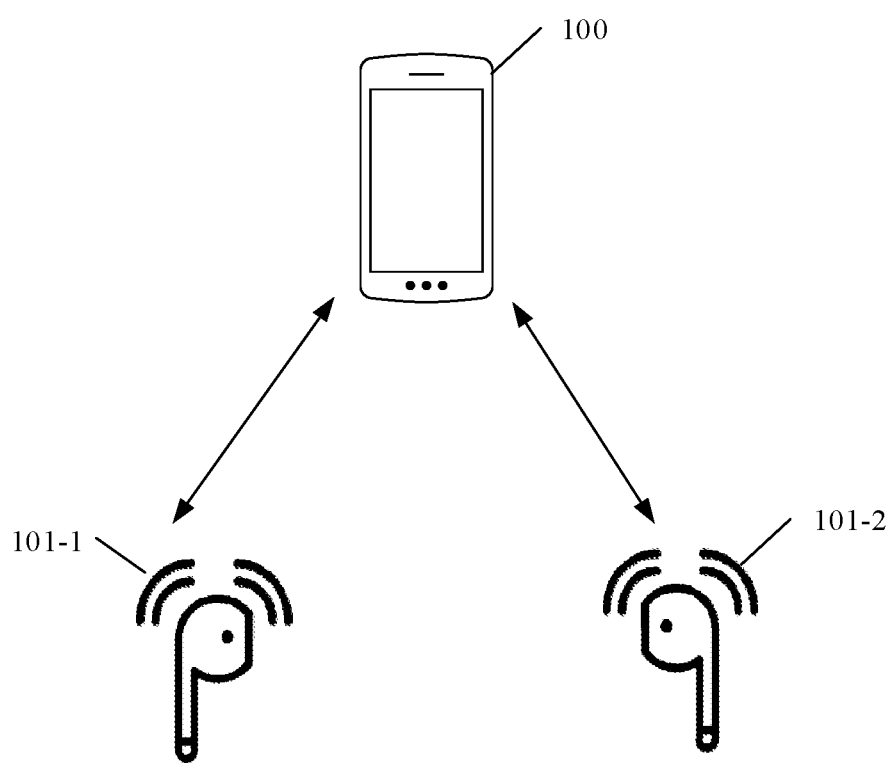
FIG. 3 is a schematic composition diagram of another communications system for transmitting audio data according to an embodiment of this application.

On the other hand, a left earbud and a right earbud of a TWS headset are used as audio input/output devices of an electronic device, and may be used together (this is referred to as a double-earbud mode) to implement a function such as music playing or voice communication. As shown in FIG. 3, an earbud 101-1 and an earbud 101-2 of a TWS headset 101 is used as an audio input/output device of an electronic device 100 (for example, a mobile phone), and may be used together to implement a function such as music playing or voice communication.

Generally, in a double-earbud mode, the electronic device 100 configures a CIG including two CISs (for example, a CIS (1) and a CIS (2)) for the TWS headset 101. The electronic device may separately establish an ACL link with left and right earbuds of the TWS headset.

For example, the electronic device may establish an ACL link 1 with the earbud 101-1, and establish an ACL link 2 with the earbud 101-2. The electronic device 100 may create the CIS (1) through the ACL link 1, where the CIS (1) is used to transmit audio data between the electronic device 100 and the earbud 101-1. The CIS (1) is carried on an ISO channel 1 between the electronic device 100 and the earbud 101-1. The electronic device 100 may create the CIS (2) through the ACL link 2, where the CIS (2) is used to transmit audio data between the electronic device 100 and the earbud 101-2. The CIS (2) is carried on an ISO channel 2 between the electronic device 100 and the earbud 101-2.

It should be noted that the CIG includes two CISs (for example, the CIS (1) and the CIS (2)). For example, as shown in (a) in FIG. 10 or in (a) in FIG. 12, a CIG event (x) includes a CIS (1) event (x) and a CIS (2) event (x). The CIG event (x) is a CIG event of a CIG. One CIG includes a plurality of CIG events. The electronic device 100 may transmit audio data to the earbuds 101-1 and 101-2 by using a plurality of CIG events in one CIG.

A plurality of CISs of a same CIG may share a same CIG presentation point (CIG_presentation point). The CIG presentation point is a time point after the electronic device 100 sends audio data. The earbud 101-1 corresponding to the CIS (1) and the earbud 101-2 corresponding to the CIS (2) may simultaneously play the received audio data at the CIG presentation point. In this way, play-level synchronization of an audio stream between the two earbuds can be implemented (in other words, the two earbuds simultaneously play the audio data).

In conclusion, in the conventional technology, in the single-earbud mode, the electronic device 100 configures a CIG including only one CIS for the TWS headset 101. In the double-earbud mode, the electronic device 100 configures a CIG including two CISs for the TWS headset 101. Therefore, if switching between the single-earbud mode and the double-earbud mode (for example, switching from the single-earbud mode to the double-earbud mode, or switching from the double-earbud mode to the single-earbud mode) occurs in a music playing or voice communication process, the electronic device 100 needs to reconfigure a CIS. For example, when switching from the single-earbud mode to the double-earbud mode occurs, the electronic device 100 needs to reconfigure two CISs in one CIG for the two earbuds. However, it takes some time to reconfigure the CISs. Consequently, audio data is interrupted, and user experience is affected.

In the embodiments of this application, when configuring a CIS for an earbud of a TWS headset 101, regardless of whether the TWS headset 101 is in a single-earbud mode or a double-earbud mode, an electronic device 100 may configure, for the TWS headset 101, a CIG including two CISs, to resolve a problem that audio data is interrupted in the foregoing switching scenario. In this case, in the double-earbud mode, the electronic device 100 may activate the two CISs, and then transmit audio data to left and right earbuds of the TWS headset 101 by using the two CISs; and in the single-earbud mode, the electronic device 100 may activate only one CIS, and transmit audio data to a corresponding earbud by using the CIS. If switching between the single-earbud mode and the double-earbud mode occurs in a music playing or voice communication process, the electronic device 100 does not need to reconfigure a CIS, but only need to activate or deactivate a corresponding CIS. In this way, audio data transmission is not interrupted, normal audio data transmission can be ensured, and user experience can be improved.

The single-earbud mode in the embodiments of this application may include a first single-earbud mode and a second single-earbud mode. The first single-earbud mode is a mode in which a first earbud is independently used as an audio input/output device of the electronic device. The second single-earbud mode is a mode in which a second earbud is independently used as an audio input/output device of the electronic device. The double-earbud mode is a mode in which the first earbud and the second earbud are used together as audio input/output devices of the electronic device. For example, the first earbud is an earbud 101-1, and the second earbud is an earbud 101-2.

For example, the electronic device 100 may be a device such as a mobile phone (for example, the mobile phone 100 shown in FIG. 1 or FIG. 3), a tablet computer, a desktop computer, a laptop computer, a handheld computer, a notebook computer, an ultra-mobile personal computer (UMPC), a netbook, a cellular phone, a personal digital assistant (PDA), an augmented reality (AR)\virtual reality (VR) device, a media player, or a television. A specific form of the device is not particularly limited in the embodiments of this application. In the embodiments of this application, a structure of the electronic device 100 may be shown in FIG. 6A, and is described in detail in the following embodiments.

FIG. 4 is a schematic diagram of a product form of a TWS headset according to an embodiment of this application. As shown in FIG. 4, the TWS headset 101 may include an earbud 101-1, an earbud 101-2, and an earbud box 101-3. The earbud box may be used to accommodate the left and right earbuds of the TWS headset. FIG. 4 is merely a schematic diagram of a product form instance of the TWS headset. A product form of a peripheral device provided in this embodiment of this application includes but is not limited to the TWS headset 101 shown in FIG. 4.

Figure 5:
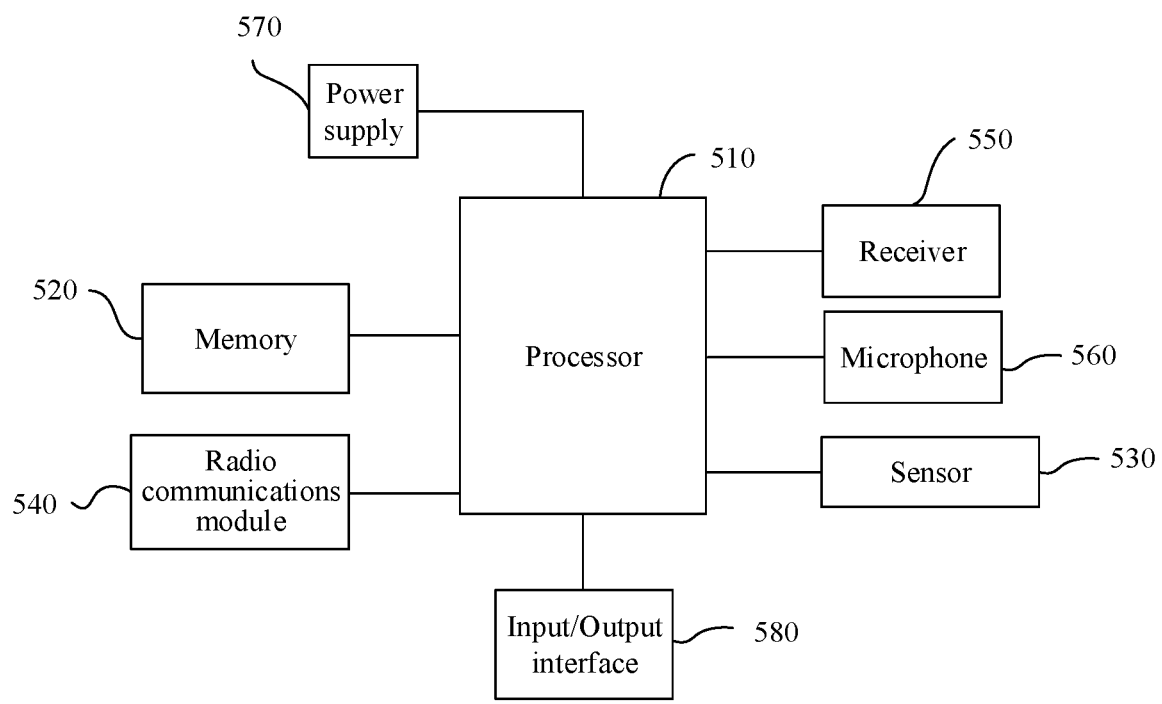
FIG. 5 is a schematic diagram of a hardware structure of an earbud of a TWS headset according to an embodiment of this application.

FIG. 5 is a schematic structural diagram of an earbud (a left earbud or a right earbud) of a TWS headset according to an embodiment of this application. As shown in FIG. 5, an earbud (for example, the earbud 101-2) of the TWS headset 101 may include a processor 510, a memory 520, a sensor 530, a radio communications module 540, a receiver 550, a microphone 560, and a power supply 570.

The memory 520 may be configured to store application program code, for example, application program code used to establish a radio connection with the other earbud (for example, the earbud 101-2) of the TWS headset 101, and enable the earbud to be paired with and connected to the electronic device 100 (for example, the mobile phone 100). The processor 510 may control execution of the foregoing application program code, to implement a function of the earbud of the TWS headset in this embodiment of this application.

The memory 520 may further store a Bluetooth address used to uniquely identify the earbud, and store a Bluetooth address of the other earbud of the TWS headset. In addition, the memory 520 may further store connection data of an electronic device that has been successfully paired with the earbud before. For example, the connection data may be a Bluetooth address of the electronic device that has been successfully paired with the earbud. Based on the connection data, the earbud can be automatically paired with the electronic device, and there is no need to configure a connection between the earbud and the electronic device, for example, there is no need to perform validity verification. The Bluetooth address may be a media access control (MAC) address.

The sensor 530 may be a distance sensor or an optical proximity sensor. The earbud may determine, by using the sensor 530, whether the earbud is worn by a user. For example, the earbud may detect, by using the optical proximity sensor, whether there is an object near the earbud, to determine whether the earbud is worn by the user. When the earbud determines that the earbud is worn, the earbud may open the receiver 550. In some embodiments, the earbud may further include a bone conduction sensor, to form a bone conduction headset. By using the bone conduction sensor, the earbud can obtain a vibration signal from a vibration bone of a vocal-cord part, and parse a voice signal, to implement a voice function. In some other embodiments, the earbud may further include a touch sensor, configured to detect a touch operation of the user. In some other embodiments, the earbud may further include a fingerprint sensor, configured to detect a user fingerprint, identify a user identity, and the like. In some other embodiments, the earbud may further include an ambient optical sensor, and may adaptively adjust some parameters such as volume based on sensed luminance of ambient light.

The radio communications module 540 is configured to support short-distance data exchange between the earbud of the TWS headset and various electronic devices, for example, the electronic device 100. In some embodiments, the radio communications module 540 may be a Bluetooth transceiver. The earbud of the TWS headset may establish a radio connection with the electronic device 100 by using the Bluetooth transceiver, to implement short-range data exchange between the electronic device 100 and the TWS headset.

At least one receiver 550, also referred to as an "earpiece", may be configured to convert an electrical audio signal into a sound signal and play the sound signal. For example, when the earbud of the TWS headset is used as an audio output device of the electronic device 100, the receiver 550 may convert a received electrical audio signal into a sound signal and play the sound signal.

At least one microphone 560, also referred to as a "mike" or a "microphone", is configured to convert a sound signal into an electrical audio signal. For example, when the earbud of the TWS headset 101 is used as an audio input device of the electronic device 100, in a process in which the user speaks (for example, makes a call or sends a voice message), the microphone 560 may collect a sound signal of the user and convert the sound signal into an electrical audio signal. The electrical audio signal is audio data in the embodiments of this application.

The power supply 570 may be configured to supply power to each component included in the earbud of the TWS headset 101. In some embodiments, the power supply 570 may be a battery, for example, a rechargeable battery.

Generally, the TWS headset 101 is provided with an earbud box (for example, the earbud box 101-3 shown in FIG. 4). The earbud box may be used to accommodate the left and right earbuds of the TWS headset. As shown in FIG. 4, the earbud box 101-3 may be used to accommodate the earbud 101-1 and the earbud 101-2 of the TWS headset. In addition, the earbud box may further charge the left and right earbuds of the TWS headset 101. Correspondingly, in some embodiments, the earbud may further include an input/output interface 580. The input/output interface 580 may be configured to provide any wired connection between the earbud of the TWS headset and the earbud box (for example, the earbud box 101-3).

In some embodiments, the input/output interface 580 may be an electrical connector. When the earbud of the TWS headset 101 is placed in the earbud box, the earbud of the TWS headset 101 may be electrically connected to the earbud box (for example, connected to an input/output interface of the earbud box) by using the electrical connector. After the electrical connection is established, the earbud box may charge the power supply 570 of the earbud of the TWS headset. After the electrical connection is established, the earbud of the TWS headset 101 may further perform data communication with the earbud box. For example, the earbud of the TWS headset 101 may receive a pairing instruction from the earbud box through the electrical connection. The pairing instruction is used to instruct the earbud of the TWS headset 101 to open the radio communications module 540, so that the earbud of the TWS headset 101 can be paired with and connected to the electronic device 100 by using a corresponding wireless communications protocol (for example, Bluetooth).

Certainly, the earbud of the TWS headset 101 may alternatively not include the input/output interface 580. In this case, the earbud may implement a charging or data communication function based on a radio connection established between the earbud and the earbud box by using the radio communications module 540.

In addition, in some embodiments, the earbud box (for example, the earbud box 101-3) may further include components such as a processor and a memory. The memory may be configured to store application program code, and the application program code is executed under control of the processor of the earbud box, to implement a function of the earbud box. For example, when the user opens a cover of the earbud box, the processor of the earbud box may send, by executing the application program code stored in the memory, the pairing instruction and the like to the earbud of the TWS headset in response to the user operation of opening the cover of the earbud box.

It may be understood that a structure shown in this embodiment of this application does not constitute a specific limitation on the earbud of the TWS headset 101. The earbud of the TWS headset 101 may have more or fewer components than those shown in FIG. 5, or may have a combination of two or more components, or may have different component configurations. For example, the earbud may further include components such as an indicator (which may indicate a status such as a battery level of the earbud) and a dust filter (which may be used with the earpiece). Various components shown in FIG. 5 may be implemented by using hardware, software, or a combination of hardware and software that includes one or more signal processing or application-specific integrated circuits.

It should be noted that the left and right earbuds of the TWS headset 101 may have a same structure. For example, the left earbud and the right earbud of the TWS headset 101 each may include the components shown in FIG. 5. Alternatively, the left and right earbuds of the TWS headset 101 may have different structures. For example, one earbud (for example, the right earbud) of the TWS headset 101 may include all the components shown in FIG. 5, and the other earbud (for example, the left earbud) may include all the components in FIG. 5 except the microphone 560.

Figure 6A:
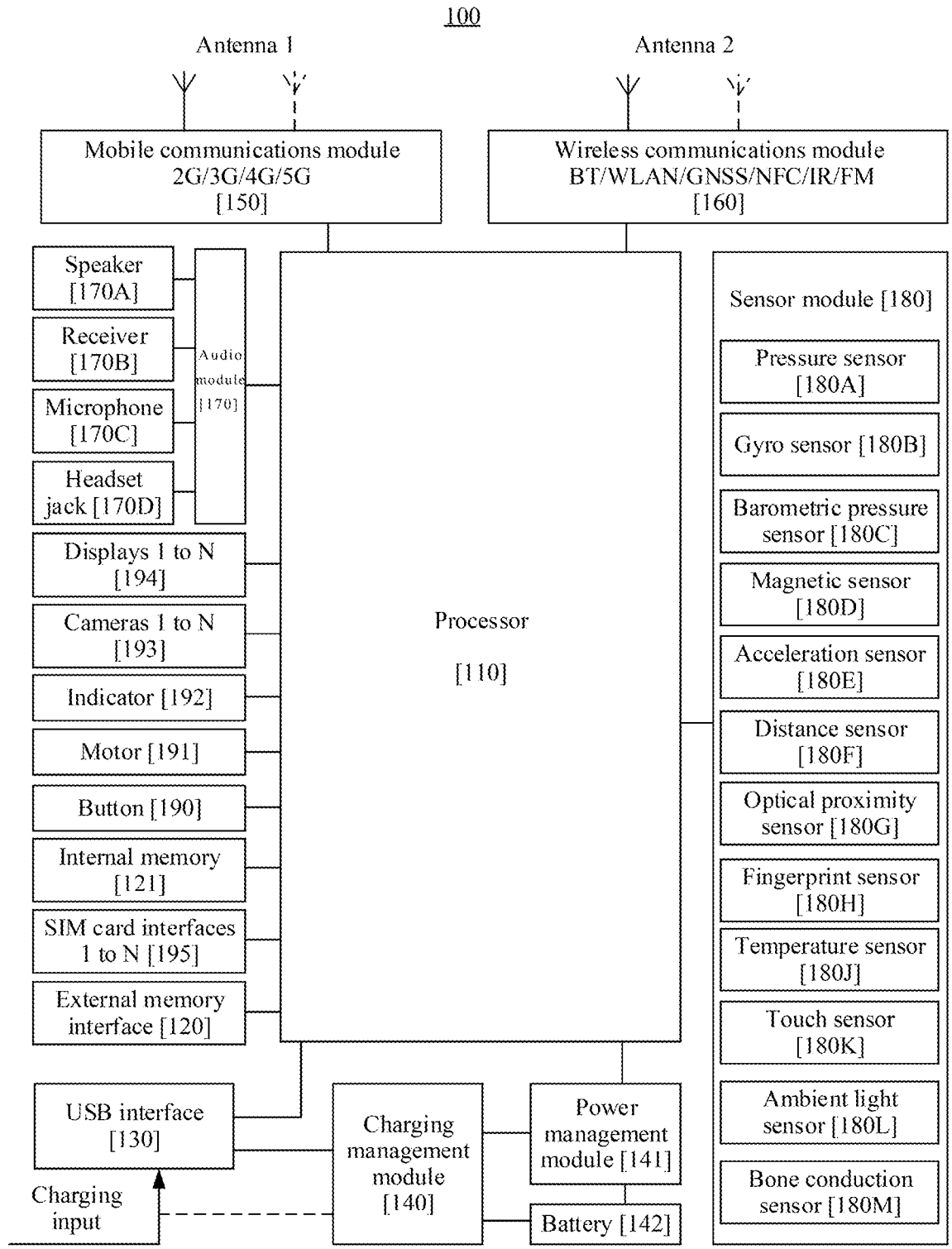
FIG. 6A is a schematic diagram of a hardware structure of an electronic device according to an embodiment of this application.

For example, the electronic device is a mobile phone 100. FIG. 6A is a schematic structural diagram of the electronic device 100. As shown in FIG. 6A, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent components, or may be integrated into one or more processors.

The controller may be a nerve center and a command center of the electronic device 100. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has just been used or is cyclically used by the processor 110.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules shown in this embodiment of the present invention is merely used as an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive a charging input from a charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input by using a wireless charging coil of the electronic device 100. The charging management module 140 supplies power to the electronic device by using the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits an obtained signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communications module 160 may be one or more devices that integrate at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS). For example, in this embodiment of this application, the electronic device 100 may establish a wireless connection to a peripheral device through the wireless communications module 160 by using the wireless communications technology such as Bluetooth (BT). Based on the established wireless connection, the electronic device 100 may send voice data to the peripheral device, or may receive voice data from the peripheral device.

The electronic device 100 implements a display function by using the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode or active-matrix organic light-emitting diode (AMOLED), a flexible light-emitting diode (FLED), a mini-LED, a micro-LED, a micro-OLED, quantum-dot light-emitting diodes (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. In some embodiments, the ISP may be disposed in the camera 193. The camera 193 is configured to capture a static image or a video. In some embodiments, the electronic device 100 may include one or N cameras 193, where N is a positive integer greater than 1. The video codec is configured to compress or decompress a digital video. The electronic device 100 may support one or more types of video codecs.

The external memory interface 120 may be configured to connect to an external storage card such as a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to execute various function applications and data processing of the electronic device 100. For example, in this embodiment of this application, the processor 110 may execute the instructions stored in the internal memory 121, to establish the wireless connection with the peripheral device through the wireless communications module 160, and perform short-range data exchange with the peripheral device, to implement functions such as calling and music playing by using the peripheral device. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the internal memory 121 may include a high-speed random access memory, or may include a nonvolatile memory such as at least one magnetic disk storage device, a flash storage device, or a universal flash storage (UFS). In this embodiment of this application, after the electronic device 100 establishes the wireless connection with the peripheral device by using the wireless communications technology, for example, Bluetooth, the electronic device 100 may store a Bluetooth address of the peripheral device in the internal memory 121. In some embodiments, when the peripheral device is a device such as a TWS headset including two main bodies, left and right earbuds of the TWS headset each have a Bluetooth address, and the electronic device 100 may associatively store the Bluetooth addresses of the left and right earbuds of the TWS headset in the internal memory 121.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When the electronic device 100 is used to answer a call or receive audio information, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce noise, recognize a sound source, implement a directional recording function, and the like.

In this embodiment of this application, when the electronic device 100 establishes a wireless connection with a peripheral device 101, for example, a TWS headset, the TWS headset may be used as an audio input/output device of the electronic device 100. For example, the audio module 170 may receive an electrical audio signal transmitted by the wireless communications module 160, to implement functions such as call answering and music playing by using the TWS headset. For example, in a call process of a user, the TWS headset may collect a sound signal of the user, convert the sound signal into an electrical audio signal, and send the electrical audio signal to the wireless communications module 160 of the electronic device 100. The wireless communications module 160 transmits the electrical audio signal to the audio module 170. The audio module 170 may convert the received electrical audio signal into a digital audio signal, encode the digital audio signal, and then transfer an encoded digital audio signal to the mobile communications module 150. The mobile communications module 150 transmits the encoded digital audio signal to a peer device of the call, to implement the call. For another example, when a user plays music by using the media player of the electronic device 100, the application processor may transmit, to the audio module 170, an electrical audio signal corresponding to the music played by the media player. The audio module 170 transmits the electrical audio signal to the wireless communications module 160. The wireless communications module 160 may send the electrical audio signal to the TWS headset, so that the TWS headset converts the electrical audio signal into a sound signal and then plays the sound signal.

The headset jack 170D is configured to connect to a wired headset. The headset jack 170D may be a USB interface 130, a 3.5 mm open mobile terminal platform (OMTP) standard interface, or a cellular telecommunications industry association (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A such as a resistive pressure sensor, an inductive pressure sensor, and a capacitive pressure sensor. When a force is applied to the pressure sensor 180A, capacitance between electrodes changes. The electronic device 100 determines strength of the force based on the change of the capacitance. When a touch operation is performed on the display 194, the electronic device 100 detects strength of the touch operation by using the pressure sensor 180A. The electronic device 100 may further calculate a touch location based on a detection signal of the pressure sensor 180A. In some embodiments, touch operations that are performed at a same touch location but have different touch operation strength may correspond to different operation instructions. For example, when a touch operation with touch operation strength less than a first pressure threshold is performed on a Messages application icon, an instruction for viewing an SMS message is executed. When a touch operation with touch operation strength greater than or equal to a first pressure threshold is performed on a Messages application icon, an instruction for creating a new SMS message is executed.

The gyro sensor 180B may be configured to determine a motion posture of the electronic device 100. The gyro sensor 180B may be further used in a navigation scenario and a motion-sensing game scenario. The barometric pressure sensor 180C is configured to measure barometric pressure. The magnetic sensor 180D includes a Hall sensor. The acceleration sensor 180E may detect magnitude of accelerations in various directions (usually on the three axes) of the electronic device 100. The distance sensor 180F is configured to measure a distance. The electronic device 100 may detect, by using the optical proximity sensor 180G, that the user holds the electronic device 100 close to an ear for a call, so that the electronic device 100 automatically turns off the screen for power saving. The optical proximity sensor 180G may also be used in a smart cover mode or a pocket mode to automatically unlock or lock the screen. The ambient light sensor 180L is configured to sense ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The temperature sensor 180J is configured to detect a temperature. The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100 at a position different from a position of the display 194. The bone conduction sensor 180M may obtain a vibration signal. The bone conduction sensor 180M may also be in contact with a human pulse, to receive a blood pressure beating signal. The application processor may parse heart rate information based on the blood pressure beating signal obtained by the bone conduction sensor 180M, to implement a heart rate detection function.

The buttons 190 include a power button, a volume button, and the like. The button 190 may be a mechanical button, or may be a touch button. The electronic device 100 may receive a button input, generate a button signal input related to a user setting and function control of the electronic device 100. The motor 191 may generate a vibration prompt. The motor 191 may be configured to provide an incoming call vibration prompt and a touch vibration feedback. The indicator 192 may be an indicator light, and may be used to indicate a charging status and a power change, or may be used to indicate a message, a missed call, a notification, and the like. The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The electronic device 100 interacts with a network by using the SIM card, to implement a call function, a data communication function, and the like.

Terms related to the embodiments of this application are described as follows:

1. CIG and CIS

A CIG identifier (CIG ID) is used to identify a CIG. For example, a CIG (1) and a CIG (2) are used to identify different CIGs. One CIG may include a plurality of CISs. In an ISO channel transmission mechanism, a transmission channel between a source device and each destination device is defined as a CIS. Each destination device corresponds to one CIS. For example, a mobile phone 100 and left and right earbuds of a TWS headset 101 are used as examples. The mobile phone 100 may configure one CIG for the left and right earbuds of the TWS headset 101, and specify that the CIG includes two CISs, for example, a CIS (1) and a CIS (2). An earbud 101-1 corresponds to the CIS (1), and an earbud 101-2 corresponds to the CIS (2). Each CIS has a different CIS identifier (CIS ID). For example, the CIS (1) and the CIS (2) have different identifiers. A plurality of CISs in a same CIG share a same CIG synchronization point and CIG presentation point, to implement play-level synchronization of audio data between a plurality of peripheral devices.

Figure 6B:
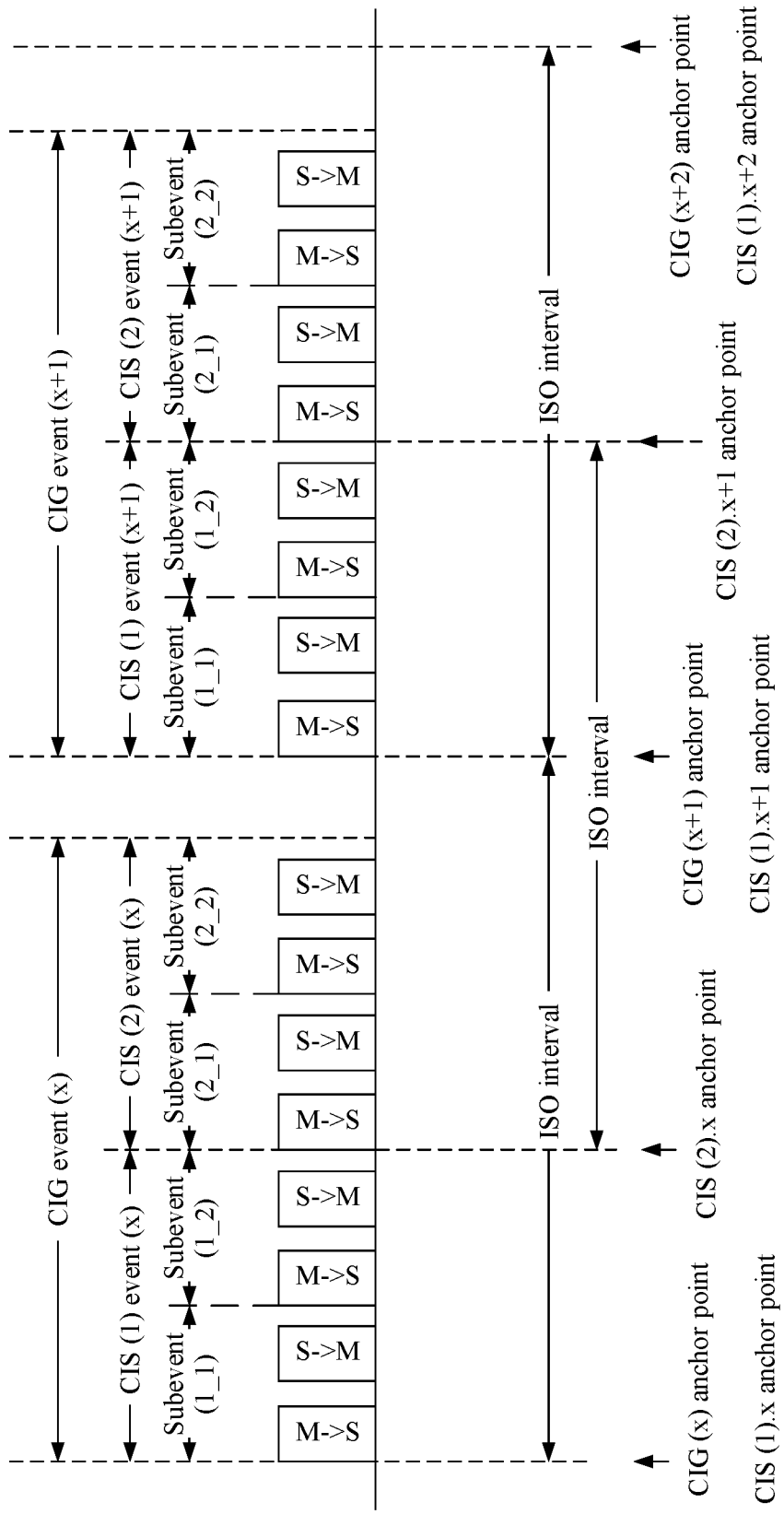
FIG. 6B is a schematic diagram of a principle of transmitting audio data through an ISO channel according to an embodiment of this application.

One CIG includes a plurality of CIG events (CIG event). For example, the CIG (1) may include a CIG event (x), a CIG event (x+1), and the like shown in FIG. 6B. Each CIG event belongs to one ISO interval (ISO interval) in terms of time. For example, as shown in FIG. 6B, a CIG event (x) belongs to an ISO interval between a CIG (x) anchor point (anchor point) and a CIG (x+1) anchor point in terms of time, and a CIG event (x+1) belongs to an ISO interval between the CIG (x+1) anchor point and a CIG (x+2) anchor point in terms of time. A CIG anchor point is a start time point of a corresponding CIG event. For example, the CIG (x) anchor point is a start time point of the CIG event (x).

Each CIG event may include a plurality of CIS events (CIS event). For example, as shown in FIG. 6B, the CIG event (x) includes a CIS (1) event (x) and a CIS (2) event (x), and the CIG event (x+1) includes a CIS (1) event (x+1) and a CIS (2) event (x+1).

Each CIS may include a plurality of CIS events. For example, the CIS (1) may include the CIS (1) event (x) and the CIS (1) event (x+1) shown in FIG. 6B. The CIS (2) may include the CIS (2) event (x) and the CIS (2) event (x+1) shown in FIG. 6B.

Each CIS event belongs to one ISO interval in terms of time. For example, as shown in FIG. 6B, the CIS (1) event (x) belongs to an ISO interval between a CIS (1).x anchor point and a CIS (1).x+1 anchor point in terms of time; the CIS (2) event (x) belongs to an ISO interval between a CIS (2).x anchor point and a CIS (2).x+1 anchor point in terms of time; and the CIS (1) event (x+1) belongs to an ISO interval between the CIS (1).x+1 anchor point and the CIS (1).x+1 anchor point in terms of time.

An ISO interval is a time period between two consecutive CIS anchor points. Two consecutive CIS anchor points are two consecutive anchor points of a same CIS. For example, the CIS (1).x anchor point and the CIS (1).x+1 anchor point are two consecutive anchor points of the CIS (1). A CIS anchor point is a start time point of a corresponding CIS event. For example, the CIS (1).x anchor point is a start time point of the CIS (1) event (x).

2. Subevent (Subevent)

Each CIS may define NSE subevents within one ISO interval. To be specific, each CIS event includes the number of subevents (number of subevents, NSE) subevents. A value of the NSE is greater than or equal to 1. For example, as shown in any one of FIG. 6B, (a) in FIG. 10, or (a) in FIG. 12, an NSE (that is, N1) of a CIS (1) is equal to 2, and a CIS (1) event (x) includes a subevent (1_1) and a subevent (1_2); and an NSE (that is, N2) of a CIS (2) is equal to 2, and a CIS (2) event (x) includes a subevent (2_1) and a subevent (2_2).

As shown in FIG. 6B, each subevent includes one "M→S" and one "S→M". The "M→S" is used by a source device to send audio data to a destination device, and is used by the destination device to receive the audio data sent by the source device. The "S→M" is used by the destination device to send audio data to the source device, and is used by the source device to receive the audio data sent by the destination device. For example, an "M→S" of the CIS (1) is used by a mobile phone 100 to send audio data to an earbud 101-1, and is used by the earbud 101-1 to receive the audio data sent by the mobile phone 100. An "S→M" of the CIS (1) is used by the earbud 101-1 to send data (such as audio data or feedback information) to the mobile phone 100, and is used by the mobile phone 100 to receive the data sent by the earbud 101-1. An "M→S" of the CIS (2) is used by an electronic device 1, namely, the mobile phone 100, to send audio data to an earbud 101-2, and is used by the earbud 101-2 to receive the audio data sent by the mobile phone 100. An "S→M" of the CIS (2) is used by the earbud 101-2 to send data (such as audio data or feedback information) to the mobile phone 100, and is used by the mobile phone 100 to receive the data sent by the earbud 101-2. The feedback information may be an acknowledgement (ACK) or a negative acknowledgement (NACK).

Each subevent (Sub_event) belongs to one subinterval (Sub interval) in terms of time. A subinterval of a CIS may be a time period between a start time point of one subevent of a CIS event and a start time point of a next subevent of the same CIS event. For example, as shown in any one of (a) in FIG. 10 or (a) in FIG. 12, a subinterval of the CIS (1) (that is, CIS(1)_subinterval) may be a time period between a start time point of the subevent (1_1) of the CIS (1) event (x) and a start time point of the subevent (1_2) of the CIS (1) event (x). A subinterval of the CIS (2) (that is, CIS(2)_subinterval) may be a time period between a start time point of the subevent (2_1) of the CIS (2) event (x) and a start time point of the subevent (2_2) of the CIS (2) event (x).

It should be noted that, when an ISO interval is fixed, a larger NSE indicates more subevents (Sub_event) included in one ISO interval, more data packets transmitted in the ISO interval, and a higher duty cycle of an ISO channel. The mobile phone 100 may determine the NSE based on a requirement of audio data for a duty cycle of an ISO channel.

Figure 7:
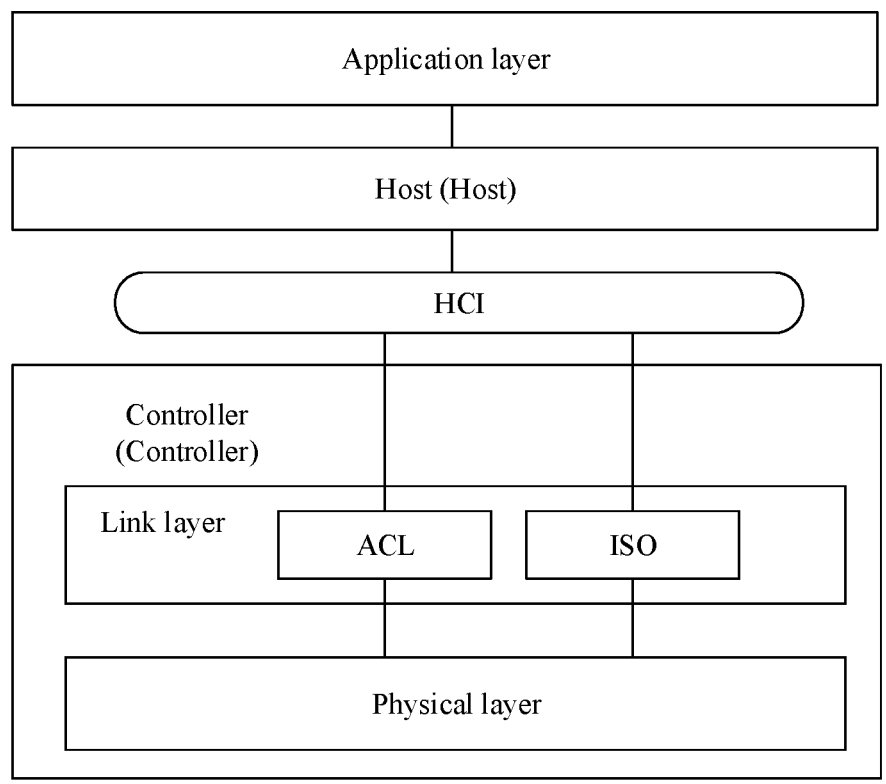
FIG. 7 shows a BLE-based audio protocol framework according to an embodiment of this application.

FIG. 7 shows a BLE-based audio protocol framework according to an embodiment of this application. As shown in FIG. 7, the protocol framework may include an application layer, a host (Host), a host controller interface (HCI), and a controller.

The controller includes a link layer and a physical layer. The physical layer is responsible for providing a physical channel used for data transmission. A communications system usually includes several different types of channels such as a control channel, a data channel, and a voice channel. The link layer includes an ACL link and an ISO channel. The ACL link is used to transmit a control message between devices, for example, a content control message (such as a previous song and a next song). The ISO channel may be used to transmit isochronous data (namely, audio data) between devices.

The host communicates with the controller through the HCI, and an HCI instruction is used as a medium used for communication between the host and the controller. The host may be implemented in an application processor (AP) of a device, and the controller may be implemented in a Bluetooth chip of the device. Optionally, in a small-sized device, the host and the controller may be implemented in a same processor or controller. In this case, the HCI is optional.

For ease of understanding, the following describes, in detail with reference to the accompanying drawings, an audio data transmission method provided in the embodiments of this application. The following embodiments all use an example in which an electronic device is a mobile phone 100, a first earbud of a TWS headset is an earbud 101-1 of the TWS headset 101, and a second earbud is an earbud 101-2 of the TWS headset 101 for description.

In the embodiments of this application, regardless of whether one earbud (for example, the earbud 101-1) of the TWS headset 101 is independently used as an audio input/output device of the mobile phone 100 (namely, in a single-earbud mode) or two earbuds (the earbud 101-1 and the earbud 101-2) of the TWS headset 101 are used together as audio input/output devices of the mobile phone 100 (namely, in a double-earbud mode), the mobile phone 100 may configure a first CIG including two CISs (for example, a first CIS and a second CIS) for the TWS headset 101.

Figure 8:
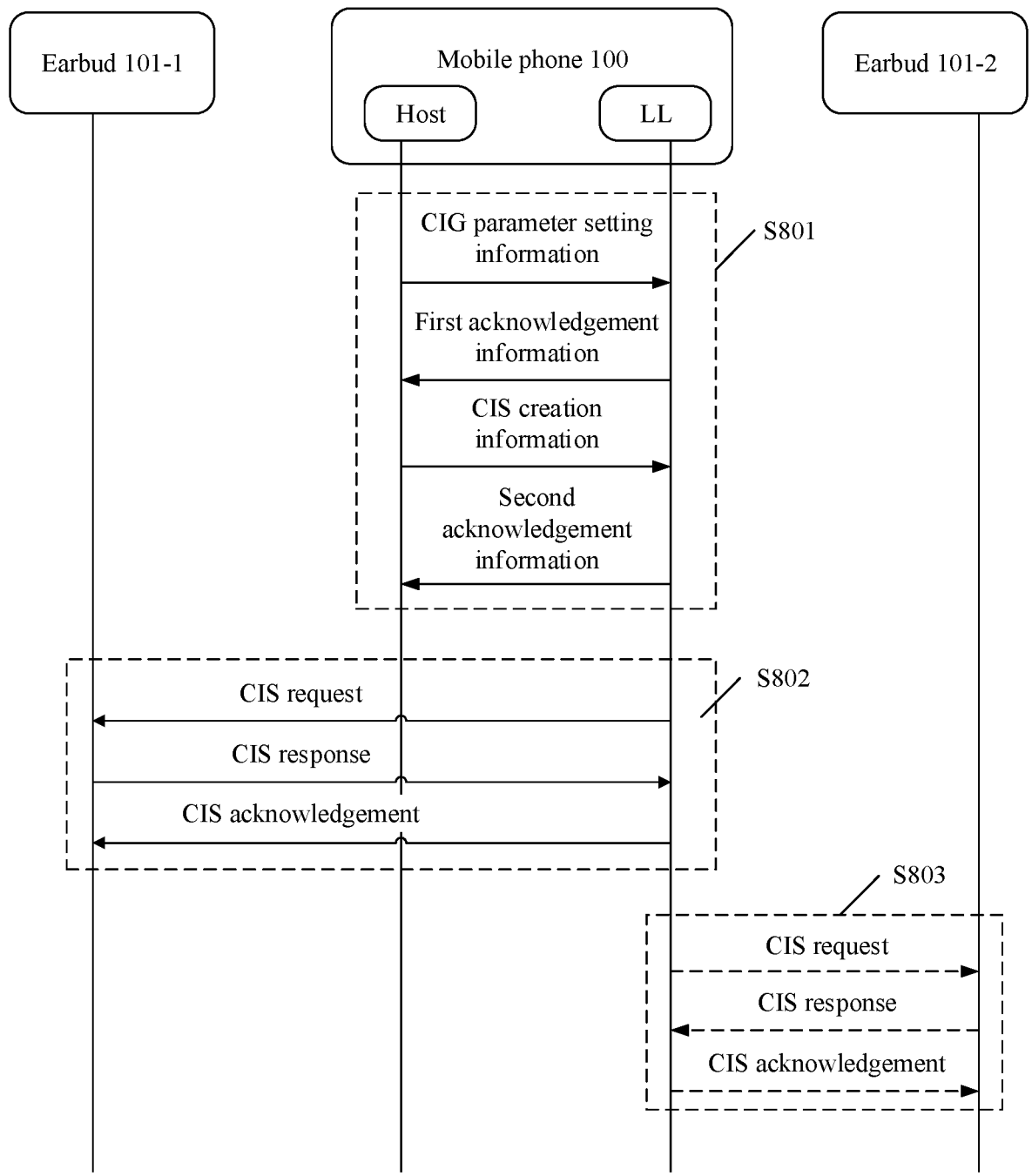
FIG. 8 is a schematic diagram of a procedure of configuring a CIG and creating a CIS according to an embodiment of this application.

As shown in FIG. 8, a process in which a mobile phone 100 configures a first CIG and creates a CIS is described in an embodiment of this application with reference to the BLE-based audio protocol framework shown in FIG. 7. The mobile phone 100 configures a CIG and creates a CIS on a premise that the mobile phone 100 and an earbud (an earbud 101-1 and/or an earbud 101-2) are in a connected (Connection) state. The mobile phone 100 and the earbud each have a host and a link layer LL (in a controller), and the host communicates with the LL through an HCI. The host and the LL of the earbud are not shown in FIG. 8.

The host of the mobile phone 100 may set a CIG parameter of the first CIG by using HCI instructions. The CIG parameter is used to create an isochronous data transmission channel (namely, a CIS). For a method for negotiating the CIG parameter between the mobile phone 100 and the earbud, refer to a method for negotiating a CIG parameter between electronic devices in the conventional technology. Details are not described in this embodiment of this application.

For example, in response to a service request from an application layer 901, the host of the mobile phone 100 may set the CIG parameter of the first CIG based on audio data and the LL of the mobile phone 100. The mobile phone 100 may set different CIG parameters for different audio data.

Specifically, the host of the mobile phone 100 may send CIG parameter setting information to the LL of the mobile phone 100 through the HCI. For example, the CIG parameter setting information may be an HCI instruction "LE Set CIG parameters". Correspondingly, the LL of the mobile phone 100 may return first acknowledgement information. For example, the first acknowledgement information may be a response message "Command Complete".

Then, the host of the mobile phone 100 may initiate creation of a CIS by using an HCI instruction. Specifically, the host of the mobile phone 100 may send CIS creation information to the LL of the mobile phone 100 through the HCI. For example, the CIS creation information may be an HCI instruction "LE Create CIS". Correspondingly, the LL of the mobile phone 100 may return second acknowledgement information. For example, the second acknowledgement information may be "HCI Command Status".

CIS connection response information (for example, an LL_CIS_RSP message) is sent to the LL of the mobile phone. The LL of the mobile phone sends fourth acknowledgement information (for example, an LL_CIS_IND message) to an LL of a first earbud, and the LL of the mobile phone sends CIS connection established information (for example, an LE CIS Established message) to the host of the mobile phone. Up to now, a CIS connection link has been established between the mobile phone and the first earbud.

The LL of the mobile phone 100 may send a CIS request (for example, LL_CSI_REQ) to the earbud (for example, the earbud 101-1) to request to create the CIS. The earbud (for example, the earbud 101-1) returns a CIS response (for example, LL_CIS_RSP) to the LL of the mobile phone 100. The LL of the mobile phone 100 sends a CIS acknowledgement (for example, LL_CIS_IND) to the earbud (for example, the earbud 101-1). In addition, the LL of the mobile phone may send the CIS connection established information (for example, the LE CIS Established message) to the host of the mobile phone, which is not shown in the FIG. 8.

Up to now, the CIS has been established between the mobile phone 100 and the earbud. After the established CIS is activated, the mobile phone 100 may transmit audio data to and the earbud.

It may be understood that regardless of whether a TWS headset 101 is in a single-earbud mode or a double-earbud mode, the mobile phone 100 may configure the first CIG including two CISs for the TWS headset 101. However, not a same CIS is activated by the mobile phone 100 and the TWS headset 101 for the single-earbud mode and the double-earbud mode. Details are as follows:

In the double-earbud mode, the mobile phone 100 may activate a first CIS and a second CIS, transmit audio data to the earbud 101-1 by using the first CIS, and transmit audio data to the earbud 101-2 by using the second CIS. When the TWS headset 101 is switched from the double-earbud mode to the single-earbud mode, the mobile phone 100 may deactivate one CIS, and continue transmitting audio data to a corresponding earbud by using the other CIS.

In the single-earbud mode, the mobile phone 100 activates only one CIS (for example, the first CIS), and transmit audio data to a corresponding earbud (for example, the first earbud) by using the activated CIS. In this case, the mobile phone 100 does not activate the other CIS (for example, the second CIS). When the TWS headset 101 is switched from the single-earbud mode to the double-earbud mode, the electronic device 100 may activate the other CIS, and transmit audio data to the two earbuds by using the two CISs.

In this embodiment of this application, if switching between the single-earbud mode and the double-earbud mode occurs in a music playing or voice communication process, the electronic device 100 does not need to reconfigure an ISO channel (namely, reconfigure a CIS), but only needs to activate or deactivate a corresponding CIS. In this way, audio data transmission is not interrupted, normal audio data transmission can be ensured, and user experience can be improved.

When a user expects to use the TWS headset 101, the user may open a cover of an earbud box 101-3 of the TWS headset 101. In this case, the earbud 101-1 and the earbud 101-2 may be automatically paired and connected.

In addition, after the cover of the earbud box 101-3 is opened, either of the earbud 101-1 and the earbud 101-2 (for example, the earbud 101-2) may send a pairing broadcast externally. If the mobile phone 100 has enabled a Bluetooth function, the mobile phone 100 may receive the pairing broadcast and notify the user that a related Bluetooth device (for example, the earbud 101-2) has been scanned. After the user selects the earbud 101-2 as a to-be-connected device on the mobile phone 100, the mobile phone 100 may be paired with the earbud 101-2.

After the earbud 101-2 is paired with the mobile phone 100, the earbud 101-2 may send a Bluetooth address of the mobile phone 100 to the earbud 101-1 through a Bluetooth connection between the earbud 101-2 and the earbud 101-1, and notify the earbud 101-1 to send a pairing broadcast externally. In this way, the mobile phone 100 may receive the pairing broadcast sent by the earbud 101-1, and perform pairing with the earbud 101-1.

After the mobile phone 100 is paired with the earbud 101-2, the mobile phone 100 may establish an ACL link 1 with the earbud 101-2. After the mobile phone 100 is paired with the earbud 101-1, the mobile phone 100 may establish an ACL link 2 with the earbud 101-1.

The earbud 101-2 may further send a MAC address of the earbud 101-1 to the mobile phone 100, to indicate, to the mobile phone 100, that the earbud 101-1 and the earbud 101-2 are two main bodies of a same peripheral device (for example, the TWS headset 101).

In an embodiment of this application, a mobile phone 100 may determine, in the following Manners (1) to (3), whether a TWS headset 101 is in a single-earbud mode or a double-earbud mode. The single-earbud mode includes a first single-earbud mode and a second single-earbud mode. In other words, the mobile phone 100 may perform, in the following Manners (1) to (3), S900 shown in FIG. 9A.

Manner (1): Whether both an earbud 101-1 and an earbud 101-2 are taken out of an earbud box 101-3.

After a cover of the earbud box 101-3 is opened, a user may take out one earbud or two earbuds from the earbud box 101-3. The earbud may detect, by using a sensor (for example, an optical sensor or a touch sensor) or an electrical connector, that the earbud is taken out of the earbud box 101-3. After the earbud is taken out of the earbud box 101-3, the earbud may indicate, to the mobile phone 100, that the earbud is taken out of the earbud box 101-3. For example, the earbud 101-1 is used as an example. The earbud 101-1 may send a control command to the mobile phone 100 through an ACL link 1, to indicate that the earbud is taken out of the earbud box 101-3.

If the mobile phone 100 determines that the two earbuds of the TWS headset 101 are taken out of the earbud box 101-3, the mobile phone 100 may determine that the TWS headset 101 is in the double-earbud mode. In other words, the two earbuds (the earbud 101-1 and the earbud 101-2) of the TWS headset 101 are used together as audio input/output devices of the mobile phone 100.

If the mobile phone 100 determines that only one earbud of the TWS headset 101 is taken out of the earbud box 101-3 and the other earbud is not taken out of the earbud box 101-3, the mobile phone 100 may determine that the TWS headset 101 is in the single-earbud mode. In other words, one earbud (for example, the earbud 101-1) of the TWS headset 101 is independently used as an audio input/output device of the mobile phone 100.

Manner (2): Whether both an earbud 101-1 and an earbud 101-2 are worn.

After taking out an earbud from an earbud box 101-3, a user may wear the earbud on an ear. The earbud may detect, by using a sensor (such as an optical sensor or a bone sensor), whether the earbud is worn. After being worn, the earbud may indicate, to the mobile phone 100, that the earbud is worn. For example, the earbud 101-1 is used as an example. The earbud 101-1 may send a control command to the mobile phone 100 through an ACL link 1, to indicate that the earbud is worn.

It may be understood that, even if the two earbuds of the TWS headset 101 are taken out of the earbud box 101-3, the user may use only one earbud to perform audio data transmission between the earbud and the mobile phone 100. Based on this, in this embodiment of this application, the mobile phone 100 may determine whether both the earbud 101-1 and the earbud 101-2 are worn, to determine whether the TWS headset 101 is in the double-earbud mode or the single-earbud mode.

If the mobile phone 100 determines that the two earbuds of the TWS headset 101 are worn, the mobile phone 100 may determine that the TWS headset 101 is in the double-earbud mode. In other words, the two earbuds (the earbud 101-1 and the earbud 101-2) of the TWS headset 101 are used together as audio input/output devices of the mobile phone 100.

If the mobile phone 100 determines that only one earbud of the TWS headset 101 is worn and the other earbud is not worn, the mobile phone 100 may determine that the TWS headset 101 is in the single-earbud mode. In other words, one earbud (for example, the earbud 101-1) of the TWS headset 101 is independently used as an audio input/output device of the mobile phone 100.

Manner (3): Whether an earbud 101-1 and an earbud 101-2 are paired with and connected to each other.

In the double-earbud mode, the two earbuds of the TWS headset 101 are paired with and connected to each other. However, in the single-earbud mode, the two earbuds of the TWS headset 101 are not paired with or connected to each other. Therefore, the mobile phone 100 may determine whether the earbud 101-1 and the earbud 101-2 are paired with and connected to each other, to determine whether the TWS headset 101 is in the double-earbud mode or the single-earbud mode.

For example, in some use scenarios, after taking out one earbud (for example, the earbud 101-1) from the earbud box 101-3, the user may not continue to take out the other earbud (for example, the earbud 101-2). Then, the user closes the earbud box 101-3. After the earbud box 101-3 is closed, the earbud 101-2 in the earbud box 101-3 is disconnected from the earbud 101-1 outside the earbud box 101-3. In other words, the two earbuds of the TWS headset 101 are not paired with or connected to each other.

After the two earbuds are disconnected from each other, the earbud 101-1 outside the earbud box 101-3 may indicate, to the mobile phone 100, that the two earbuds are disconnected from each other. For example, the earbud 101-1 may send a control command to the mobile phone 100 through an ACL link 1, to indicate that the two earbuds are disconnected from each other.

If the earbud 101-1 and the earbud 101-2 are paired with and connected to each other, the mobile phone 100 may determine that the TWS headset 101 is in the double-earbud mode. In other words, the two earbuds (the earbud 101-1 and the earbud 101-2) of the TWS headset 101 are used together as audio input/output devices of the mobile phone 100.

If the earbud 101-1 and the earbud 101-2 are not paired with or connected to each other, and the other earbud is not worn, the mobile phone 100 may determine that the TWS headset 101 is in the single-earbud mode. In other words, one earbud (for example, the earbud 101-1) of the TWS headset 101 is independently used as an audio input/output device of the mobile phone 100.

It should be noted that methods for determining, by the mobile phone 100, whether the TWS headset 101 is in the single-earbud mode or the double-earbud mode include but are not limited to Manners (1) to (3). For example, the mobile phone 100 may determine whether both the earbud 101-1 and the earbud 101-2 are connected to the mobile phone, to determine whether the TWS headset 101 is in the single-earbud mode or the double-earbud mode. In some use scenarios, after taking out the earbud 101-1 from the earbud box 101-3, the user may not continue to take out the earbud 101-2. Then, the user closes the earbud box 101-3. After the earbud box 101-3 is closed, the earbud 101-2 in the earbud box 101-3 is disconnected from the mobile phone 100. In this case, the mobile phone 100 may determine that the TWS headset 101 is in the single-earbud mode.

For example, a first CIS is a CIS (1), and a second CIS is a CIS (2). When the mobile phone 100 configures a first CIG, the mobile phone 100 configures a sequential (Sequential) scheduling transmission manner or an interleaved (Interleaved) scheduling transmission manner for the CIS (1) and the CIS (2). In the sequential scheduling transmission manner and the interleaved scheduling transmission manner, CIG parameters configured for the first CIG are different. For specific descriptions of the sequential scheduling transmission manner and the interleaved scheduling transmission manner, refer to descriptions in the following embodiments. Details are not described in this embodiment of this application.

Figure 9A:
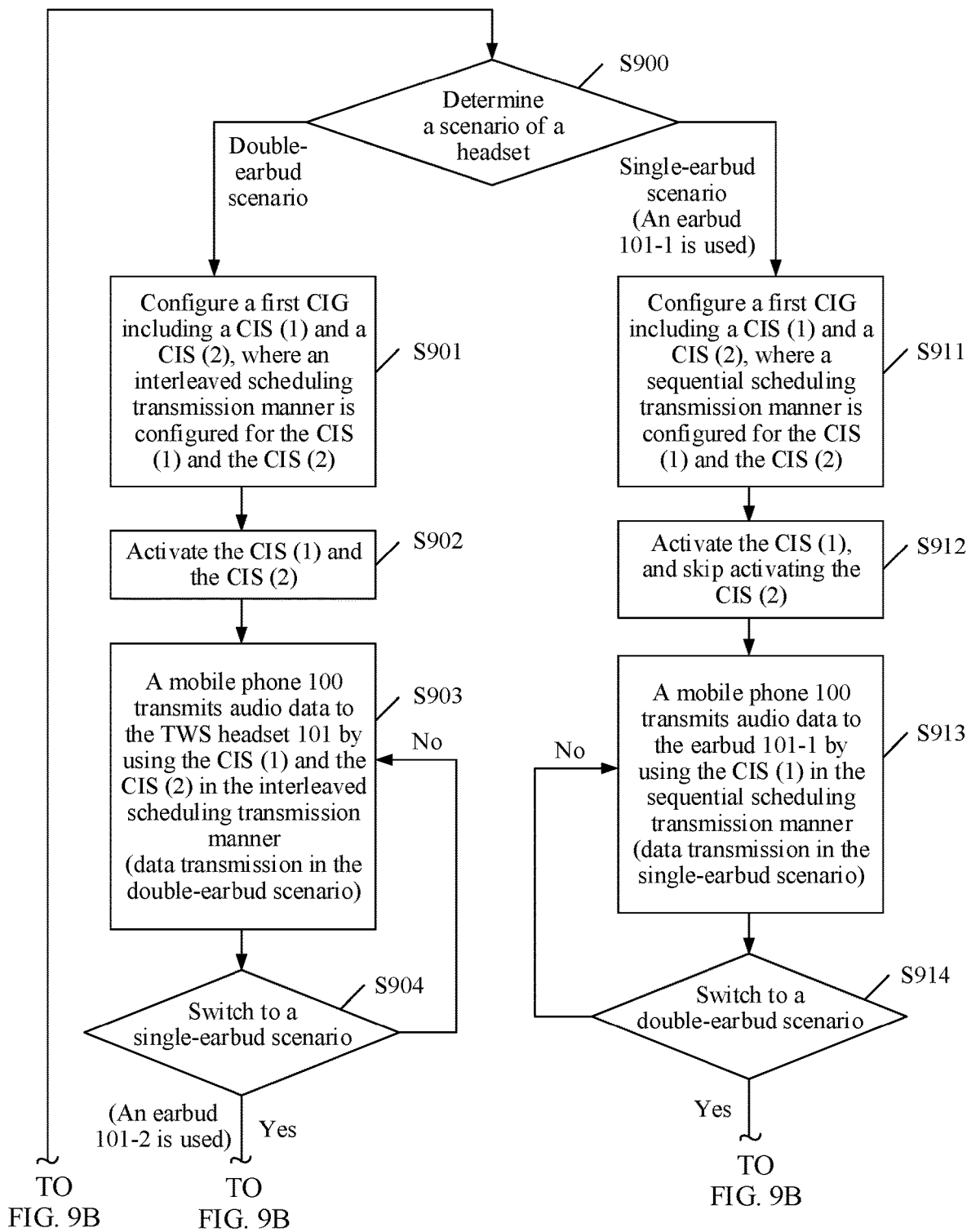
FIG. 9A and FIG. 9B are a flowchart of an audio data transmission method according to an embodiment of this application.

In some embodiments, after S900 shown in FIG. 9A is performed, it is assumed that the TWS headset 101 is in the double-earbud mode. In other words, the two earbuds (the earbud 101-1 and the earbud 101-2) of the TWS headset 101 are used together as audio input/output devices of the mobile phone 100. In this embodiment, a method in this embodiment of this application is described by using an example in which the interleaved scheduling transmission manner is configured for the CIS (1) and the CIS (2).

For example, after S900 shown in FIG. 9A is performed, if the mobile phone 100 determines that the TWS headset 101 is in the double-earbud mode, the mobile phone 100 may perform S901. The mobile phone 100 may configure the first CIG in a process of configuring a CIG in S801 shown in FIG. 8, and configure the interleaved scheduling transmission manner shown in (a) in FIG. 10 for the CIS (1) and the CIS (2). Specifically, as shown in (a) in FIG. 10 or (b) in FIG. 10, an anchor point of the CIS (1) (for example, a CIS(1).x anchor point) is an anchor point of the first CIG (for example, a CIG (x) anchor point), and an anchor point of the CIS (2) (for example, a CIS (2).x anchor point) is the same as an end point of the first subevent (that is, a subevent 1_1) of a CIS (1) event (x). In addition, a subinterval of the CIS (1) (for example, a CIS(1)_subinterval) is different from a subinterval of the CIS (2) (for example, a CIS(2)_subinterval).

Then, the mobile phone 100 and the earbud 101-1 may perform S802, to create the CIS (1) for the earbud 101-1; and the mobile phone 100 and the earbud 101-2 may perform S803, to create the CIS (2) for the earbud 101-2. A step (not shown in FIG. 9A and FIG. 9B) in which the mobile phone 100 creates the CIS (1) for the earbud 101-1 and creates the CIS (2) for the earbud 101-2 may be between S901 and S902 shown in FIG. 9A. Finally, the mobile phone 100 may indicate the earbud 101-1 to activate the CIS (1), and indicate the earbud 101-2 to activate the CIS (2) (that is, perform S902 shown in FIG. 9A). The mobile phone 100 may send an activation instruction to the earbud 101-1 through an ACL (1), and send an activation instruction to the earbud 101-2 through an ACL (2). The activation instructions are respectively used to trigger the earbud 101-1 to activate the CIS (1) and trigger the earbud 101-2 to activate the CIS (2). After the CIS (1) and the CIS (2) are activated, the mobile phone 100 may transmit audio data to the earbuds 101-1 and 101-2 in the interleaved scheduling transmission manner shown in (a) in FIG. 10 (that is, perform S903 shown in FIG. 9A).

Figure 10:
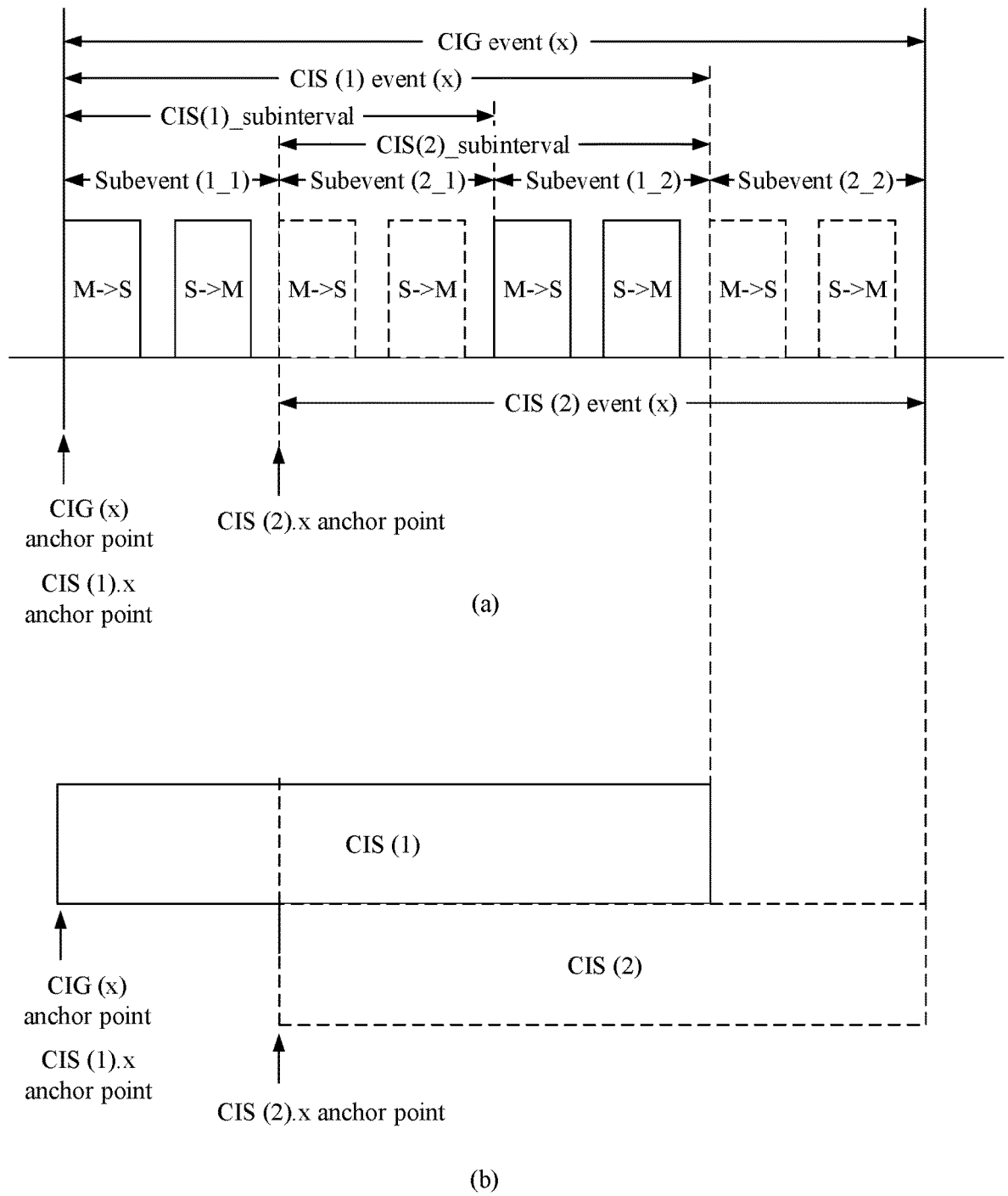
FIG. 10 is a schematic diagram of a principle of an interleaved scheduling transmission manner according to an embodiment of this application.

In the double-earbud mode, when the interleaved scheduling transmission manner shown in (a) in FIG. 10 is used, a method for transmitting audio data between the mobile phone 100 and the earbuds 101-1 and 101-2, that is, S903 shown in FIG. 9A, may specifically include the following processes (A) to (D).

Process (A): The mobile phone 100 starts to send audio data (for example, an audio data packet 1) to the earbud 101-1 from the CIS (1).x anchor point (namely, the CIG (x) anchor point) by using an "M→S" of the subevent (1_1) of the CIS (1) event (x). The earbud 101-1 may receive, by using the "M→S" of the subevent (1_1), the audio data (for example, the audio data packet 1) sent by the mobile phone 100. The earbud 101-1 sends first data to the mobile phone 100 by using an "S→M" of the subevent (1_1). The mobile phone 100 receives, by using the "S→M" of the subevent (1_1), the first data sent by the earbud 101-1. The first data may include feedback information returned by the earbud 101-1 to the mobile phone 100, and/or audio data collected by a microphone (for example, a microphone 160) in the earbud 101-1. The feedback information may be an ACK or a NACK of the audio data packet 1.

Process (B): The mobile phone 100 starts to send audio data (for example, an audio data packet 1) to the earbud 101-2 from the CIS (2).x anchor point by using an "M→S" of a subevent (2_1) of a CIS (2) event (x). The earbud 101-2 may receive, by using the "M→S" of the subevent (2_1), the audio data (for example, the audio data packet 1) sent by the mobile phone 100. The earbud 101-2 sends second data to the mobile phone 100 by using an "S→M" of the subevent (2_1). The mobile phone 100 receives, by using the "S→M" of the subevent (2_1), the second data sent by the earbud 101-2. The second data may include feedback information returned by the earbud 101-2 to the mobile phone 100, and/or audio data collected by a microphone (for example, a microphone 160) in the earbud 101-2. The feedback information may be an ACK or a NACK of the audio data packet 1.

Process (C): It is assumed that the mobile phone 100 receives the ACK of the audio data packet 1 by using the "S→M" of the subevent (1_1). The mobile phone 100 sends audio data (for example, an audio data packet 2) to the earbud 101-1 by using an "M→S" of a subevent (1_2). The earbud 101-1 may receive, by using the "M→S" of the subevent (1_2), the audio data (for example, the audio data packet 2) sent by the mobile phone 100. The earbud 101-1 sends third data to the mobile phone 100 by using an "S→M" of the subevent (1_2). The mobile phone 100 receives, by using the "S→M" of the subevent (1_2), the third data sent by the earbud 101-1. The third data may include feedback information returned by the earbud 101-1 to the mobile phone 100, and/or audio data collected by the microphone (for example, the microphone 160) in the earbud 101-1. The feedback information may be an ACK or a NACK of the audio data packet 2.

Process (D): It is assumed that the mobile phone 100 receives the ACK of the audio data packet 1 by using the "S→M" of the subevent (2_1). The mobile phone 100 sends audio data (for example, an audio data packet 2) to the earbud 101-2 by using an "M→S" of a subevent (2_2) of the CIS (2) event (x). The earbud 101-2 may receive, by using the "M→S" of the subevent (2_2), the audio data (for example, the audio data packet 2) sent by the mobile phone 100. The earbud 101-2 sends fourth data to the mobile phone 100 by using an "S→M" of the subevent (2_2). The mobile phone 100 receives, by using the "S→M" of the subevent (2_2), the fourth data sent by the earbud 101-2. The fourth data may include feedback information returned by the earbud 101-2 to the mobile phone 100, and/or audio data collected by the microphone (for example, the microphone 160) in the earbud 101-2. The feedback information may be an ACK or a NACK of the audio data packet 2.

Further, the mobile phone 100 may transmit audio data to left and right earbuds of the TWS headset 101 by using a CIG event (x+n) in a transmission manner the same as that for a CIG event (x), where n is greater than or equal to 1, and n is an integer. For a method for transmitting audio data between the mobile phone 100 and the left and right earbuds of the TWS headset 101 by using the CIG event (x+n), refer to the method for transmitting audio data by using the CIG event (x). Details are not described in this embodiment of this application again.

In a process in which the mobile phone 100 and the earbuds 101-1 and 101-2 perform S903, the TWS headset 101 may be switched between the single-earbud mode and the double-earbud mode. To be specific, the TWS headset 101 may be switched from the double-earbud mode to the single-earbud mode. In other words, the mobile phone 100 may perform S904 shown in FIG. 9A.

For example, the mobile phone 100 may determine, in the following Manners (I) to (IV), that the TWS headset 101 is switched from the double-earbud mode to the single-earbud mode. In other words, the mobile phone 100 may perform S904 in FIG. 9A in the following Manners (I) to (IV).

Manner (I): Whether the earbud 101-1 or the earbud 101-2 is put in the earbud box 101-3.

In Manner (1), if both the earbud 101-1 and the earbud 101-2 are taken out of the earbud box 101-3, the mobile phone 100 determines that the TWS headset 101 is in the double-earbud mode. Manner (I) corresponds to Manner (1). In the double-earbud mode, the mobile phone 100 may determine whether the earbud 101-1 or the earbud 101-2 is put in the earbud box 101-3, to determine whether the TWS headset 101 is switched to the single-earbud mode. For example, when either of the earbud 101-1 and the earbud 101-2 is put in the earbud box 101-3, the mobile phone 100 may determine that the TWS headset 101 is switched from the double-earbud mode to the single-earbud mode. In other words, one earbud (for example, the earbud 101-2) of the TWS headset 101 is independently used as an audio input/output device of the mobile phone 100.

The earbud may detect, by using a sensor (for example, an optical sensor or a touch sensor) or an electrical connector, that the earbud is put in the earbud box 101-3. After the earbud is put in the earbud box 101-3, the earbud may indicate, to the mobile phone 100, that the earbud is put in the earbud box 101-3. For example, the earbud 101-2 is used as an example. The earbud 101-2 may send a control command to the mobile phone 100 through the ACL link 2, to indicate that the earbud 101-2 is put in the earbud box 101-3.

Manner (II): Whether the earbud 101-1 or the earbud 101-2 is switched from a worn state to an unworn state.

In Manner (2), if both the earbud 101-1 and the earbud 101-2 are worn, the mobile phone 100 determines that the TWS headset 101 is in the double-earbud mode. Manner (II) corresponds to Manner (2). In the double-earbud mode, the mobile phone 100 may determine whether the earbud 101-1 or the earbud 101-2 is worn, to determine whether the TWS headset 101 is switched to the single-earbud mode. For example, when either of the earbud 101-1 and the earbud 101-2 is unworn, the mobile phone 100 may determine that the TWS headset 101 is switched from the double-earbud mode to the single-earbud mode. In other words, one earbud (for example, the earbud 101-2) of the TWS headset 101 is independently used as an audio input/output device of the mobile phone 100. Certainly, if neither of the earbuds is switched from a worn state to an unworn state, the TWS headset 101 is not switched from the double-earbud mode to the single-earbud mode.

For example, when an earbud is removed from an ear by the user, the earbud may detect, by using a sensor (for example, an optical sensor or a bone sensor), that the earbud is switched from a worn state to an unworn state. For example, it is assumed that both the earbud 101-1 and the earbud 101-2 are worn, and then the earbud 101-2 is removed from an ear by the user. The earbud 101-2 may detect, by using a sensor, that the earbud 101-2 is switched from a worn state to an unworn state. In this case, the earbud 101-2 may send a control command to the mobile phone 100 through the ACL link 2, to indicate that the earbud 101-2 is switched from the worn state to the unworn state.

Manner (III): Whether the earbud 101-1 and the earbud 101-2 are disconnected from each other.

Manner (III) corresponds to Manner (3). In the double-earbud mode, the two earbuds of the TWS headset 101 are paired with and connected to each other. However, in the single-earbud mode, the two earbuds of the TWS headset 101 are disconnected from each other. Therefore, the mobile phone 100 may determine whether the earbud 101-1 and the earbud 101-2 are disconnected from each other, to determine whether the TWS headset 101 is switched from the double-earbud mode to the single-earbud mode.

For example, in some use scenarios, in a process of using the two earbuds (the earbud 101-1 and the earbud 101-2) of the TWS headset 101, the user may stop using one of the two earbuds for some reasons (for example, one earbud sends a low battery prompt), and put the earbud in the earbud box 101-3. When a battery level of an earbud (for example, the earbud 101-1 or the earbud 101-2) is lower than a preset battery level threshold, the earbud may give a low battery prompt. For example, the earbud may give the low battery prompt in a voice manner or a vibration manner. After the earbud (for example, the earbud 101-1) is put in the earbud box 101-3, the earbud may be disconnected from the other earbud (for example, the earbud 101-2). In other words, the two earbuds of the TWS headset 101 are not paired with or connected to each other. After the two earbuds are disconnected from each other, an earbud (for example, the earbud 101-2) outside the earbud box 101-3 may indicate, to the mobile phone 100, that the two earbuds are disconnected from each other. For example, the earbud 101-2 may send a control command to the mobile phone 100 through an ACL link 2, to indicate that the two earbuds are disconnected from each other.

If the earbud 101-1 and the earbud 101-2 are disconnected from each other, the mobile phone 100 may determine that the TWS headset 101 is switched from the double-earbud mode to the single-earbud mode. In other words, one earbud (for example, the earbud 101-2) of the TWS headset 101 is independently used as an audio input/output device of the mobile phone 100. Certainly, if the earbud 101-1 and the earbud 101-2 are not disconnected from each other, the mobile phone 100 may determine that the TWS headset 101 is not switched to the single-earbud mode.

Manner (IV): Whether a battery level of the earbud 101-1 or the earbud 101-2 is less than a preset battery level threshold.

When a battery level of an earbud (for example, the earbud 101-1 or the earbud 101-2) is less than the preset battery level threshold, the earbud may further send a control command to the mobile phone 100 through the ACL link, to indicate that the battery level of the earbud is less than the preset battery level threshold. If a battery level of any one of the earbuds is less than the preset battery level threshold, the mobile phone 100 may determine that the TWS headset 101 is switched from the double-earbud mode to the single-earbud mode. If battery levels of the two earbuds are not less than the preset battery level threshold (in other words, the mobile phone 100 does not receive a control command that is sent by any one of the two earbuds and that indicates that a battery level is less than the preset battery level threshold), the TWS headset 101 is not switched to the single-earbud mode. Manner (IV) may correspond to any one of Manners (1) to (3).

It should be noted that methods for determining, by the mobile phone 100, whether the TWS headset 101 is switched from the double-earbud mode to the single-earbud mode include but are not limited to Manners (I) to (IV). For example, the mobile phone 100 may determine whether the earbud 101-1 or the earbud 101-2 is disconnected from the mobile phone, to determine whether the TWS headset 101 is switched from the double-earbud mode to the single-earbud mode. In some use scenarios, the user may wear one earbud on an ear of the user for use, and give the other earbud to another user for use. However, in a use process, a location of the user or the another user may change, and a location of an earbud worn by the user also changes accordingly. When a distance between any earbud and the mobile phone 100 is relatively long, the mobile phone 100 may be disconnected from the earbud. If the mobile phone 100 detects that one earbud (for example, the earbud 101-1) is disconnected from the mobile phone 100, the mobile phone 100 may determine that the TWS headset 101 is switched from the double-earbud mode to the single-earbud mode.

In Manners (I) to (IV), if the TWS headset 101 is not switched to the single-earbud mode, the mobile phone 100 may continue transmitting audio data to the two earbuds of the TWS headset 101 by using the CIS (1) and the CIS (2) in the interleaved scheduling transmission manner. To be specific, as shown in FIG. 9A and FIG. 9B, if the TWS headset 101 is not switched to the single-earbud mode, the mobile phone 100 and the left and right earbuds of the TWS headset 101 may continue performing S903.

Figure 9B:
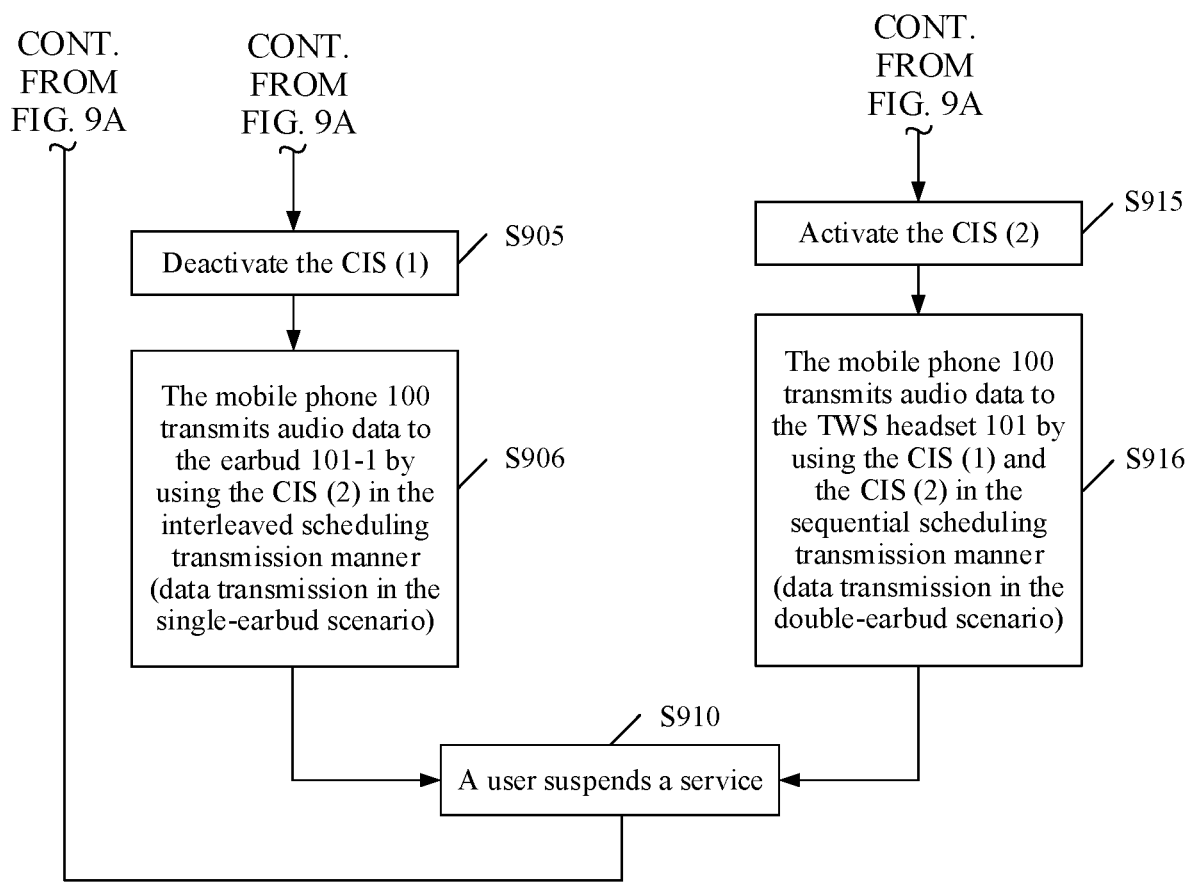

In Manners (I) to (IV), if the TWS headset 101 is switched from the double-earbud mode to the single-earbud mode (for example, the second single-earbud mode), for example, the earbud 101-2 is used but the earbud 101-1 is not used in the second single-earbud mode, the mobile phone 100 may perform S905 shown in FIG. 9B, that is, deactivate the CIS (1). After deactivating the CIS (1), the mobile phone 100 may stop transmitting audio data to the earbud 101-1 by using the CIS (1). In addition, the mobile phone 100 may continue transmitting audio data to the earbud 101-2 by using the CIS (2) in the interleaved scheduling transmission manner shown in (a) in FIG. 10 (that is, perform S906 shown in FIG. 9B).

After the TWS headset 101 is switched to the single-earbud mode (for example, the second single-earbud mode), the method for transmitting audio data between the mobile phone 100 and the earbud 101-2 in the interleaved scheduling transmission manner shown in (a) in FIG. 10, that is, S906 shown in FIG. 9B, may specifically include the foregoing processes (B) and (D), but not include the foregoing processes (A) and (C). In other words, the mobile phone 100 may only send audio data to the earbud 101-2 by using the "M→S" of the subevent (2_1) shown in (a) in FIG. 10, receive, by using the "S→M" of the subevent (2_1), audio data sent by the earbud 101-2, send audio data to the earbud 101-2 by using the "M→S" of the subevent (2_2) shown in (a) in FIG. 10, and receive, by using the "S→M" of the subevent (2_2), audio data sent by the earbud 101-2. In this case, the mobile phone 100 does not continue transmitting audio data to the earbud 101-1 by using the subevent (1_1) and the subevent (1_2).

Certainly, that the TWS headset 101 is switched from the double-earbud mode to the single-earbud mode may alternatively be that the TWS headset 101 is switched to the first single-earbud mode. In the first single-earbud mode, the earbud 101-1 is used, but the earbud 101-2 is not used. In this case, the mobile phone 100 may deactivate the CIS (2). After deactivating the CIS (2), the mobile phone 100 may stop transmitting audio data to the earbud 101-2 by using the CIS (2). In addition, the mobile phone 100 may continue transmitting audio data to the earbud 101-1 by using the CIS (1) in the interleaved scheduling transmission manner shown in (a) in FIG. 10 (this step is not shown in FIG. 9A and FIG. 9B). In this case, the mobile phone 100 and the earbud 101-1 may perform the foregoing processes (A) and (C), and the mobile phone 100 and the earbud 101-2 do not continue to perform the foregoing processes (B) and (D).

It should be noted that, in this embodiment of this application, for the mobile phone 100, only after a CIS is activated, the mobile phone 100 can transmit audio data by using the activated CIS (that is, send audio data by using an "M→S" of the corresponding CIS, and receive audio data by using an "S→M" of the corresponding CIS). Similarly, for an earbud, only after a CIS is activated, the mobile phone 100 can transmit audio data by using the activated CIS (that is, receive audio data by using an "M→S" of the corresponding CIS, and send audio data). Neither the mobile phone 100 nor the earbud transmits audio data by using a CIS that is deactivated or not activated.

It should be noted that, after S900 is performed, when the mobile phone 100 determines that the TWS headset 101 is in the double-earbud mode, the mobile phone 100 may alternatively configure the sequential scheduling transmission manner for the CIS (1) and the CIS (2) of the first CIG. For detailed descriptions of the sequential scheduling transmission manner, refer to descriptions in other parts in embodiments of this application. Details are not described herein.

In the double-earbud mode, in comparison with the sequential scheduling transmission manner, an advantage of the interleaved scheduling transmission manner lies in: The mobile phone 100 may interleave the subevent (1_1) and the subevent (1_2) of the CIS (1) with the subevent (2_1) and the subevent (2_2) of the CIS (2) in terms of time. In other words, the mobile phone 100 may interleave audio data transmission by using the CIS (1) with audio data transmission by using the CIS (2) in terms of time. In this way, interference caused to different CISs can be more even, and anti-interference performance in audio data transmission can be improved.

It may be understood that, after the TWS headset 101 is switched from the double-earbud mode to the second single-earbud mode, in a process in which the mobile phone 100 and the earbud 101-2 perform S906, the mobile phone 100 may receive a suspending operation of the user. The suspending operation is used to trigger the TWS headset to temporarily stop playing audio data. The method in this embodiment of this application may further include S910 after S906.

For example, the suspending operation may be a tap operation (for example, a single-tap operation) that is performed by the user on a "pause" button on a music playing screen displayed on the mobile phone 100 in a process in which the earbud 101-2 is used as an output device of the mobile phone 100 to perform S906 to play music. Alternatively, the suspending operation may be a start operation performed by the user on a "mute" button on the mobile phone 100. The "mute" button may be a physical button on the mobile phone 100.

For another example, the suspending operation may be a tap operation (for example, a single-tap operation) that is performed by the user on a "pause" button on a game screen displayed on the mobile phone 100 in a game scenario in which the earbud 101-2 is used as an input/output device of the mobile phone 100 to perform S906. Alternatively, the suspending operation may be a start operation performed by the user on a "mute" button on the mobile phone 100.

For another example, the suspending operation may be a tap operation (for example, a single-tap operation) performed by the user on a "hang up" button on a voice communication screen displayed on the mobile phone 100 in a process in which the earbud 101-2 is used as an input/output device of the mobile phone 100 to perform S906 to perform voice communication.

For another example, the suspending operation may alternatively be a first operation (for example, a single-tap operation, a touch-and-hold operation, or a double-tap operation) performed by the user on a preset physical button on the earbud 101-2 in the foregoing music playing, voice communication, or game scenario. The first operation performed by the user on the preset physical button is used to trigger the earbud 101-2 to temporarily stop playing and to temporarily stop collecting a sound signal. It may be understood that another operation (for example, a second operation) performed on the preset physical button may trigger the earbud 101-2 to perform another event (for example, to be paired with the earbud 101-1 or to be disconnected from the earbud 101-1).

In the foregoing embodiment, in response to the suspending operation, the mobile phone 100 may temporarily stop transmitting audio data to the earbud 101-1. After the TWS headset 101 is switched from the double-earbud mode to the single-earbud mode (for example, the second single-earbud mode), to avoid a case in which a CIS transmission manner configured by the mobile phone 100 for an earbud is not suitable in a current mode (that is, the single-earbud mode, for example, the second single-earbud mode) of the TWS headset 101, the mobile phone 100 configures, for the CIS (1) and the CIS (2), the interleaved scheduling transmission manner that is more suitable in the double-earbud mode. In this way, interference caused to the CIS (1) and the CIS (2) can be more even, and anti-interference performance in audio data transmission can be improved. However, after the TWS headset 101 is switched to the single-earbud mode (for example, the second single-earbud mode), it is assumed that the earbud 101-2 is independently used as an input/output device of the mobile phone 100. If the interleaved scheduling transmission manner shown in (a) in FIG. 10 is still used for audio data transmission, the mobile phone 100 transmits audio data to the earbud 101-2 by using only the subevent (2_1) and the subevent (2_2), and the mobile phone 100 stops transmitting audio data to the earbud 101-1 by using the subevent (1_1) and the subevent (1_2). In this case, there is an idle time period (that is, the subevent (1_2)) between the subevent (2_1) and the subevent (2_2), and the subevent (2_1) and the subevent (2_2) are not continuous in time. The idle time period may be occupied by other transmission (for example, Wi-Fi). This increases a possibility that interference may be caused to audio data transmission between the mobile phone 100 and the earbud 101-2 by using the subevent (2_1) and the subevent (2_2).

Based on this, in response to the suspending operation, the mobile phone 100 may perform S900 again to determine whether the TWS headset 101 is currently in the single-earbud mode or the double-earbud mode, and then perform S901 or S911 based on a determining result, that is, configure the first CIG for the TWS headset 101. In the foregoing instance, because the TWS headset 101 is currently in the single-earbud mode (for example, the first single-earbud mode), the mobile phone 100 may perform S911, that is, configure the sequential scheduling transmission manner for the CIS (1) and the CIS (2). For a specific method for configuring, by the mobile phone 100, the sequential scheduling transmission manner for the CIS (1) and the CIS (2), refer to descriptions in other parts in the following embodiments. Details are not described herein.

It may be understood that, in response to the suspending operation, the audio data is suspended (namely, stopped). The mobile phone 100 reconfigures a CSI in an audio data suspending process. In this way, after a service is restarted, the mobile phone 100 can transmit the audio data by using the reconfigured CIS, and the service is not interrupted due to reconfiguration of the CIS.

Figure 11:
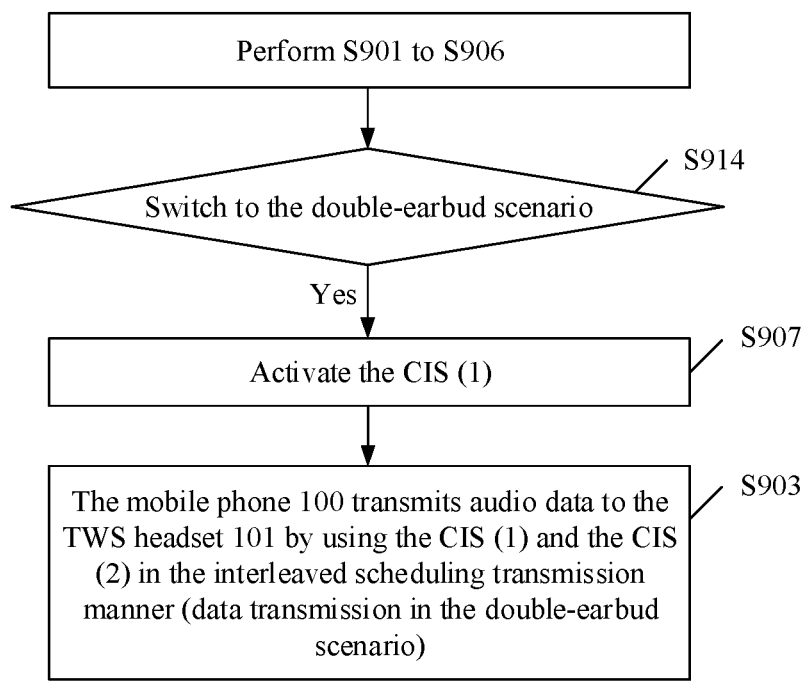
FIG. 11 is a flowchart of another audio data transmission method according to an embodiment of this application.

Further, with reference to the foregoing embodiment, after S901 to S906 are performed (after switching from the double-earbud mode to the single-earbud mode occurs), the TWS headset 101 may be further re-switched to the double-earbud mode. For example, as shown in FIG. 11, after S901 to S906 are performed, the method in this embodiment of this application may further include S914. After S914 is performed, the mobile phone 100 may activate the CIS (1), that is, perform S907. Then, as shown in FIG. 11, the mobile phone 100 may transmit audio data to the two earbuds of the TWS headset 101 by using the CIS (1) and the CIS (2) in the interleaved scheduling transmission manner (that is, perform S903). After S903 is performed, the method in this embodiment of this application may further include S904 to S906 and S910.

In some other embodiments, after S900 shown in FIG. 9A is performed, it is assumed that the TWS headset 101 is in the single-earbud mode (for example, the first single-earbud mode). In other words, one earbud (for example, the earbud 101-1) of the TWS headset 101 is independently used as an audio input/output device of the mobile phone 100. In this embodiment, the method in this embodiment of this application is described by using an example in which the sequential scheduling transmission manner is configured for the CIS (1) and the CIS (2).

For example, after S900 shown in FIG. 9A is performed, if the mobile phone 100 determines that the TWS headset 101 is in the single-earbud mode (for example, the first single-earbud mode), the mobile phone 100 may perform S911. The mobile phone 100 may configure the first CIG in a process of configuring a CIG in S801 shown in FIG. 8, and configure the sequential scheduling transmission manner shown in (a) in FIG. 12 for the CIS (1) and the CIS (2). Specifically, as shown in (a) in FIG. 12 or (b) in FIG. 12, an anchor point of the CIS (1) (for example, a CIS(1).x anchor point) is an anchor point of the first CIG (for example, a CIG (x) anchor point), and an anchor point of the CIS (2) (for example, a CIS (2).x anchor point) is the same as an end point of a CIS (1) event (x). In addition, a subinterval of the CIS (1) (for example, a CIS(1)_subinterval) is the same as a subinterval of the CIS (2) (for example, a CIS(2)_subinterval).

Then, the mobile phone 100 and the earbud 101-1 may perform S802, to create the CIS (1) for the earbud 101-1; and the mobile phone 100 and the earbud 101-2 may perform S803, to create the CIS (2) for the earbud 101-2. A step (not shown in FIG. 9A and FIG. 9B) in which the mobile phone 100 creates the CIS (1) for the earbud 101-1 and creates the CIS (2) for the earbud 101-2 may be between S911 and S912 shown in FIG. 9A. Finally, the mobile phone 100 may indicate the earbud 101-1 to activate the CIS (1), but does not indicate the earbud 101-2 to activate the CIS (2) (that is, perform S912 shown in FIG. 9A). The mobile phone 100 may send an activation instruction to the earbud 101-1 through an ACL (1). The activation instruction is used to trigger the earbud 101-1 to activate the CIS (1). The mobile phone 100 does not send an activation instruction to the earbud 101-2, and therefore the earbud 101-2 does not activate the CIS (2). After the CIS (1) is activated, the mobile phone 100 may transmit audio data to the earbud 101-1 in the sequential scheduling transmission manner shown in (a) in FIG. 12 (that is, perform S913 shown in FIG. 9A).

Figure 12:
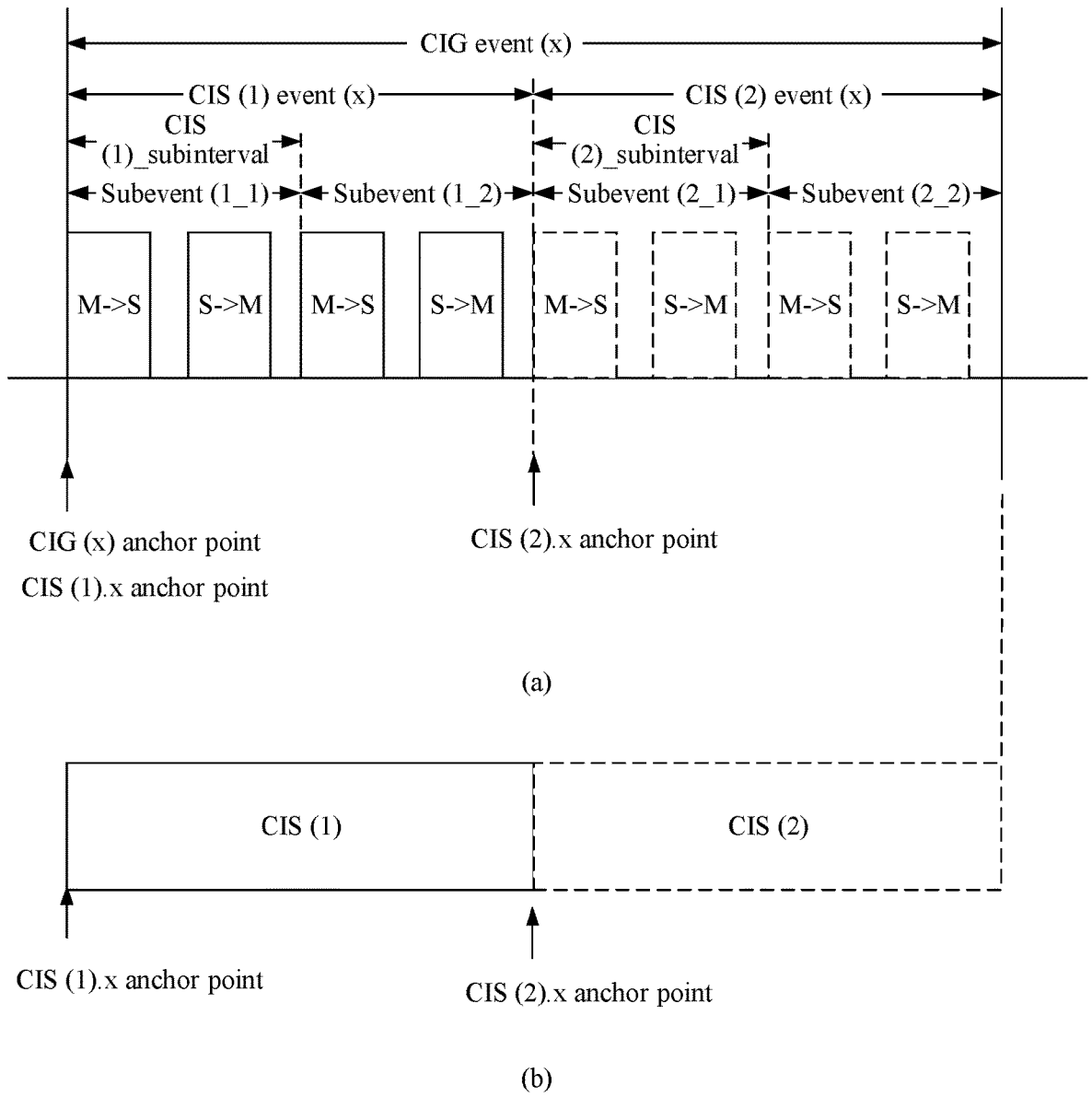
FIG. 12 is a schematic diagram of a principle of a sequential scheduling transmission manner according to an embodiment of this application.

In the single-earbud mode (for example, the first single-earbud mode), a method for transmitting audio data between the mobile phone 100 and the earbud 101-1 in the sequential scheduling transmission manner shown in (a) in FIG. 12, that is, S913 shown in FIG. 9A, may specifically include the following processes (a) and (b):

Process (a): The mobile phone 100 starts to send audio data (for example, an audio data packet 1) to the earbud 101-1 from the CIS (1).x anchor point (namely, the CIG (x) anchor point) by using an "M→S" of a subevent (1_1) of the CIS (1) event (x). The earbud 101-1 may receive, by using the "M→S" of the subevent (1_1), the audio data (for example, the audio data packet 1) sent by the mobile phone 100. The earbud 101-1 sends first data to the mobile phone 100 by using an "S→M" of the subevent (1_1). The mobile phone 100 receives, by using the "S→M" of the subevent (1_1), the first data sent by the earbud 101-1. The first data may include feedback information returned by the earbud 101-1 to the mobile phone 100, and/or audio data collected by a microphone (for example, a microphone 160) in the earbud 101-1. The feedback information may be an ACK or a NACK of the audio data packet 1.

Process (b): It is assumed that the mobile phone 100 receives the ACK of the audio data packet 1 by using the "S→M" of the subevent (1_1). The mobile phone 100 sends audio data (for example, an audio data packet 2) to the earbud 101-1 by using an "M→S" of a subevent (1_2). The earbud 101-1 may receive, by using the "M→S" of the subevent (1_2), the audio data (for example, the audio data packet 2) sent by the mobile phone 100. The earbud 101-1 sends third data to the mobile phone 100 by using an "S→M" of the subevent (1_2). The mobile phone 100 receives, by using the "S→M" of the subevent (1_2), the third data sent by the earbud 101-1. The third data may include feedback information returned by the earbud 101-1 to the mobile phone 100, and/or audio data collected by the microphone (for example, the microphone 160) in the earbud 101-1. The feedback information may be an ACK or a NACK of the audio data packet 2.

It should be noted that, in the single-earbud mode (for example, the first single-earbud mode, that is, when the earbud 101-1 is used as an input/output device of the mobile phone 100), the mobile phone 100 does not transmit audio data to the earbud 101-2 by using a subevent (2_1) and a subevent (2_2) shown in (a) in FIG. 12. In other words, S913 shown in FIG. 9A does not include the following processes (c) and (d).

Further, the mobile phone 100 may transmit audio data to the earbud 101-1 by using a CIG event (x+n) in a transmission manner the same as that for a CIG event (x), where n is greater than or equal to 1, and n is an integer. For a method for transmitting audio data between the mobile phone 100 and the earbud 101-1 by using the CIG event (x+n), refer to the method for transmitting audio data by using the CIG event (x). Details are not described in this embodiment of this application again.

In a process in which the mobile phone 100 and the earbud 101-1 perform S913, switching between the single-earbud mode and the double-earbud mode may occur on the TWS headset 101. To be specific, the TWS headset 101 may be switched from the single-earbud mode (for example, the first single-earbud mode) to the double-earbud mode. In other words, the mobile phone 100 may perform S914 shown in FIG. 9A.

For example, the mobile phone 100 may determine, in the following manners (i) to (iii), that the TWS headset 101 is switched from the single-earbud mode to the double-earbud mode. In other words, the mobile phone 100 may perform S914 in FIG. 9A in the following Manners (i) to (iii).

Manner (i): The earbud 101-2 is taken out of the earbud box 101-3.

In Manner (1), if both the earbud 101-1 and the earbud 101-2 are taken out of the earbud box 101-3, the mobile phone 100 determines that the TWS headset 101 is in the double-earbud mode; and if one earbud (for example, the earbud 101-1) is taken out of the earbud box 101-3, and the other earbud (for example, the earbud 101-2) is not taken out of the earbud box 101-3, the mobile phone 100 determines that the TWS headset 101 is in the single-earbud mode.

Manner (i) corresponds to Manner (1). In the single-earbud mode, the mobile phone 100 may determine whether the earbud 101-2 is taken out of the earbud box 101-3, to determine whether the TWS headset 101 is switched to the double-earbud mode. For example, after the earbud 101-2 is taken out of the earbud box 101-3, the mobile phone 100 may determine that the TWS headset 101 is switched from the single-earbud mode to the double-earbud mode. In other words, the two earbuds (for example, the earbud 101-2) of the TWS headset 101 are used together as audio input/output devices of the mobile phone 100.

Manner (ii): Whether the earbud 101-2 is switched from an unworn state to a worn state.

In Manner (2), if both the earbud 101-1 and the earbud 101-2 are worn, the mobile phone 100 determines that the TWS headset 101 is in the double-earbud mode; and if only one earbud (for example, the earbud 101-1) is worn, the mobile phone 100 determines that the TWS headset 101 is in the single-earbud mode. Manner (ii) corresponds to Manner (2). In the single-earbud mode, the mobile phone 100 may determine whether the earbud 101-2 is switched from the unworn state to the worn state, to determine whether the TWS headset 101 is switched to the double-earbud mode. For example, when the earbud 101-1 is already worn, after the earbud 101-2 is worn, the mobile phone 100 may determine that the TWS headset 101 is switched from the single-earbud mode to the double-earbud mode. In other words, the two earbuds (for example, the earbud 101-2) of the TWS headset 101 are used together as audio input/output devices of the mobile phone 100.

Manner (iii): The earbud 101-1 and the earbud 101-2 are paired with and connected to each other.

Manner (iii) corresponds to Manner (3). In the single-earbud mode, the two earbuds of the TWS headset 101 are not paired with or connected to each other or are disconnected from each other. Therefore, the mobile phone 100 may determine whether the earbud 101-1 and the earbud 101-2 are paired with and connected to each other, to determine whether the TWS headset 101 is switched from the single-earbud mode to the double-earbud mode.

It should be noted that methods for determining, by the mobile phone 100, whether the TWS headset 101 is switched from the single-earbud mode to the double-earbud mode include but are not limited to Manners (i) to (iii). For example, in the single-earbud mode (when the earbud 101-1 has established a connection with the mobile phone 100), the mobile phone 100 may determine whether the earbud 101-2 establishes a connection with the mobile phone, to determine whether the TWS headset 101 is switched from the single-earbud mode to the double-earbud mode.

In Manners (i) to (iii), if the TWS headset 101 is not switched to the double-earbud mode, the mobile phone 100 may continue transmitting audio data to the earbud 101-1 by using the CIS (1) in the sequential scheduling transmission manner. To be specific, as shown in FIG. 9A and FIG. 9B, if the TWS headset 101 is not switched to the double-earbud mode, the mobile phone 100 and the left or right earbud of the TWS headset 101 may continue performing S913.

In Manners (i) to (iii), if the TWS headset 101 is switched from the single-earbud mode to the double-earbud mode, the mobile phone 100 may perform S915 shown in FIG. 9B, that is, activate the CIS (2). After the CIS (2) is activated, the mobile phone 100 may transmit audio data to the earbud 101-2 by using the CIS (2). In addition, the mobile phone 100 may continue transmitting audio data to the earbud 101-1 by using the CIS (1) in the sequential scheduling transmission manner shown in (a) in FIG. 12 (that is, perform S916 shown in FIG. 9B).

After the TWS headset 101 is switched to the double-earbud mode, the method for transmitting audio data between the mobile phone 100 and the two earbuds of the TWS headset in the sequential scheduling transmission manner shown in (a) in FIG. 12, that is, S916 shown in FIG. 9B, may specifically include the foregoing processes (a) and (b) and the following processes (c) and (d):

Process (c): The mobile phone 100 starts to send audio data (for example, an audio data packet 1) to the earbud 101-2 from the CIS (2).x anchor point by using an "M→S" of a subevent (2_1) of a CIS (2) event (x). The earbud 101-2 may receive, by using the "M→S" of the subevent (2_1), the audio data (for example, the audio data packet 1) sent by the mobile phone 100. The earbud 101-2 sends second data to the mobile phone 100 by using an "S→M" of the subevent (2_1). The mobile phone 100 receives, by using the "S→M" of the subevent (2_1), the second data sent by the earbud 101-2. The second data may include feedback information returned by the earbud 101-2 to the mobile phone 100, and/or audio data collected by a microphone (for example, a microphone 160) in the earbud 101-2. The feedback information may be an ACK or a NACK of the audio data packet 1.

Process (d): It is assumed that the mobile phone 100 receives the ACK of the audio data packet 1 by using the "S→M" of the subevent (2_1). The mobile phone 100 sends audio data (for example, an audio data packet 2) to the earbud 101-2 by using an "M→S" of a subevent (2_2) of the CIS (2) event (x). The earbud 101-2 may receive, by using the "M→S" of the subevent (2_2), the audio data (for example, the audio data packet 2) sent by the mobile phone 100. The earbud 101-2 sends fourth data to the mobile phone 100 by using an "S→M" of the subevent (2_2). The mobile phone 100 receives, by using the "S→M" of the subevent (2_2), the fourth data sent by the earbud 101-2. The fourth data may include feedback information returned by the earbud 101-2 to the mobile phone 100, and/or audio data collected by the microphone (for example, the microphone 160) in the earbud 101-2. The feedback information may be an ACK or a NACK of the audio data packet 2.

In other words, after the TWS headset 101 is switched from the single-earbud mode to the double-earbud mode, the mobile phone 100 may transmit audio data to the earbud 101-1 by using the subevent (1_1) and the subevent (1_2) shown in (a) in FIG. 12, and transmit audio data to the earbud 101-1 by using the subevent (2_1) and the subevent (2_2) shown in (a) in FIG. 12.

It should be noted that, after S900 is performed, when the mobile phone 100 determines that the TWS headset 101 is in the single-earbud mode, the mobile phone 100 may alternatively configure the interleaved scheduling transmission manner for the CIS (1) and the CIS (2) of the first CIG. For specific descriptions of the interleaved scheduling transmission manner, refer to descriptions in other parts in embodiments of this application. Details are not described herein.

In the single-earbud mode, in comparison with the interleaved scheduling transmission manner, an advantage of the sequential scheduling transmission manner lies in: The mobile phone 100 may transmit audio data to one earbud (for example, the earbud 101-1) in continuous time (for example, the subevent (1_1) and the subevent (1_2) are continuous in time). In this way, interference caused to a CIS can be reduced, and anti-interference performance in audio data transmission can be improved.

In addition, in the single-earbud mode, when the sequential scheduling transmission manner is used, a relatively long continuous idle time (for example, time corresponding to the subevent (2_1) and the subevent (2_2)) may be reserved for other transmission (for example, Wi-Fi). In this way, mutual interference caused by transmission resources used when frequent switching between Wi-Fi and Bluetooth occurs can be reduced.

It may be understood that, after the TWS headset 101 is switched from the single-earbud mode to the double-earbud mode, in a process in which the mobile phone 100 and the earbud 101-2 perform S906, the mobile phone 100 may receive a suspending operation of the user. For detailed descriptions of the suspending operation, refer to related content in the foregoing embodiments. Details are not described in this embodiment of this application again. In response to the suspending operation, the mobile phone 100 may temporarily stop transmitting audio data to the earbuds 101-1 and 101-2. After the TWS headset 101 is switched from the single-earbud mode to the double-earbud mode, to avoid a case in which a CIS transmission manner configured by the mobile phone 100 for the earbuds is not suitable in a current scenario (for example, the double-earbud mode), the mobile phone 100 configures, for the CIS (1) and the CIS (2), the sequential scheduling transmission manner that is more suitable in the single-earbud mode. In this way, the mobile phone can transmit audio data to one earbud in continuous time, and anti-interference performance in audio data transmission can be improved. However, after the TWS headset 101 is switched to the double-earbud mode, if the sequential scheduling transmission manner shown in (a) in FIG. 12 is still used for audio data transmission, only after transmitting, by the mobile phone 100, audio data to the earbud 101-1 by using the CIS (1) event (x) (that is, the subevent (1_1) and the subevent (1_2)) is complete, the mobile phone 100 transmits audio data to the earbud 101-2 by using the CIS(2) event (x) (that is, the subevent (2_1) and the subevent (2_2)). In comparison with the interleaved scheduling mode, interference caused to the CIS (1) and the CIS (2) may differ greatly.

Based on this, in response to the suspending operation, the mobile phone 100 may perform S900 again to determine whether the TWS headset 101 is currently in the single-earbud mode or the double-earbud mode, and then perform S901 or S911 based on a determining result, that is, configure the first CIG for the TWS headset 101. In the foregoing instance, because the TWS headset 101 is currently in the double-earbud mode, the mobile phone 100 may perform S911, that is, configure the interleaved scheduling transmission manner for the CIS (1) and the CIS (2). For a specific method for configuring, by the mobile phone 100, the interleaved scheduling transmission manner for the CIS (1) and the CIS (2), refer to descriptions in the foregoing embodiments. Details are not described herein again.

It should be noted that, generally, after the mobile phone 100 configures the CIS (that is, configures an audio data transmission manner), regardless of specific switching that occurs on the TWS headset 101 (for example, the TWS headset 101 is switched from the single-earbud mode to the double-earbud mode, or switched from the double-earbud mode to the single-earbud mode), the mobile phone 100 transmits audio data to the TWS headset 101 in the configured transmission manner (for example, the sequential scheduling transmission manner or the interleaved scheduling transmission manner), until the audio data ends. In other words, provided that the audio data transmission manner is not changed, the audio data is not interrupted due to switching between the single-earbud mode and the double-earbud mode of the TWS headset 101.

Only when the mobile phone 100 receives the suspending operation and the audio data is suspended (namely, stopped), the mobile phone 100 can reconfigure a CSI in an audio data suspending process. In this way, after a service is restarted, the mobile phone 100 can transmit the audio data by using the reconfigured CIS, and the service is not interrupted due to reconfiguration of the CIS. In addition, a reconfigured transmission manner is more suitable for a current mode of the TWS headset 101 (for example, the single-earbud mode or the double-earbud mode). Therefore, audio data transmission efficiency can be improved.

Figure 13:
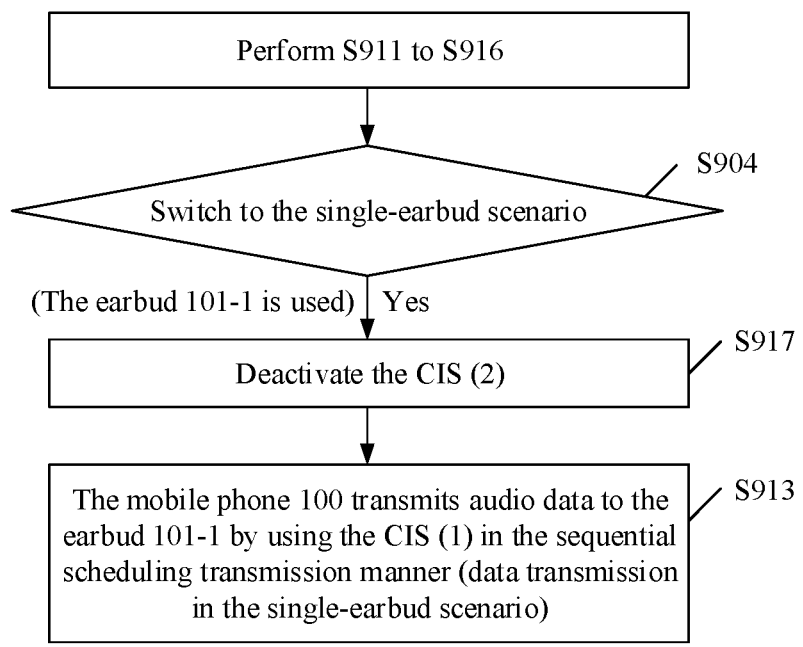
FIG. 13 is a flowchart of another audio data transmission method according to an embodiment of this application.

Further, with reference to the foregoing embodiment, after S911 to S916 are performed (after switching from the double-earbud mode to the single-earbud mode occurs), the TWS headset 101 may be further re-switched to the single-earbud mode. For example, as shown in FIG. 13, after S911 to S916 are performed, the method in this embodiment of this application may further include S904. After S904, the mobile phone 100 may deactivate the CIS (2), that is, perform S917. Then, as shown in FIG. 13, the mobile phone 100 may transmit audio data to the earbud 101-1 by using the CIS (1) in the sequential scheduling transmission manner (that is, perform S913). After S913 is performed, the method in this embodiment of this application may further include S914 to S916 and S910.

In some embodiments, in the double-earbud mode, the mobile phone 100 may send different audio data to the earbud 101-1 and the earbud 101-2. For example, the earbud 101-1 is a left earbud, and the earbud 101-2 is a right earbud. The mobile phone 100 sends left-channel audio data to the earbud 101-1, and sends right-channel audio data to the earbud 101-2. The earbud 101-1 plays the left-channel audio data, and the earbud 101-2 plays the right-channel audio data. In other words, the earbud 101-1 and the earbud 101-2 play stereo audio data jointly. In this case (briefly referred to as a case 1), the mobile phone 100 may separately perform encoding processing (that is, left and right channel encoding) on the audio data to be sent to the left and right earbuds.

In some other embodiments, in the double-earbud mode, the mobile phone 100 may send same audio data to the earbud 101-1 and the earbud 101-2. The audio data sent by the mobile phone 100 to both the earbud 101-1 and the earbud 101-2 is mono audio data. The earbud 101-1 and the earbud 101-2 may play the mono audio data. In this case (briefly referred to as a case 2), the mobile phone 100 may perform mono encoding on the audio data to be sent to both the left and right earbuds.

In the single-earbud mode, for a purpose of improving listening experience of the user, the mobile phone 100 cannot perform left and right channel encoding, and cannot send, to an earbud that is in use, audio data that has undergone left channel encoding or right channel encoding. The mobile phone 100 may perform mono encoding on audio data, and an earbud may play mono audio data.

In the case (1), if the TWS headset 101 is switched from the double-earbud mode to the single-earbud mode, the mobile phone 100 needs to change an encoding manner from left and right channel encoding to mono encoding. Similarly, if the TWS headset 101 is switched from the single-earbud mode to the double-earbud mode corresponding to the case (1), the mobile phone 100 needs to change an encoding manner from mono encoding to left and right channel encoding.

In the case (2), if the TWS headset 101 is switched between the single-earbud mode and the double-earbud mode, for example, switched from the double-earbud mode to the single-earbud mode, or switched from the single-earbud mode to the double-earbud mode, the mobile phone 100 does not need to change an encoding manner.

In the double-earbud mode corresponding to the case (2), when the foregoing sequential scheduling or interleaved scheduling transmission manner is used, the mobile phone 100 may separately transmit same audio data to the left and right earbuds of the TWS headset 101 in different time. For example, the mobile phone 100 transmits the audio data packet 1 to the earbud 101-1 by using the "M→S" of the subevent (1_1) shown in (a) in FIG. 10 or (a) in FIG. 12. The mobile phone 100 transmits the audio data packet 1 to the earbud 101-2 by using the "M→S" of the subevent (2_1) shown in (a) in FIG. 10 or (a) in FIG. 12. If the mobile phone 100 repeatedly transmits same audio data in different time periods, transmission resources are wasted, and effective transmission resource utilization is reduced.

In some other embodiments, when configuring the first CIG, the mobile phone 100 may configure a joint scheduling transmission manner for the CIS (1) and the CIS (2), to improve effective transmission resource utilization.

For example, it is assumed that the TWS headset 101 is in the double-earbud mode. In other words, the two earbuds (the earbud 101-1 and the earbud 101-2) of the TWS headset 101 are used together as audio input/output devices of the mobile phone 100. In this embodiment, the method in this embodiment of this application is described by using an example in which the joint scheduling transmission manner is configured for the CIS (1) and the CIS (2).

Figure 14:
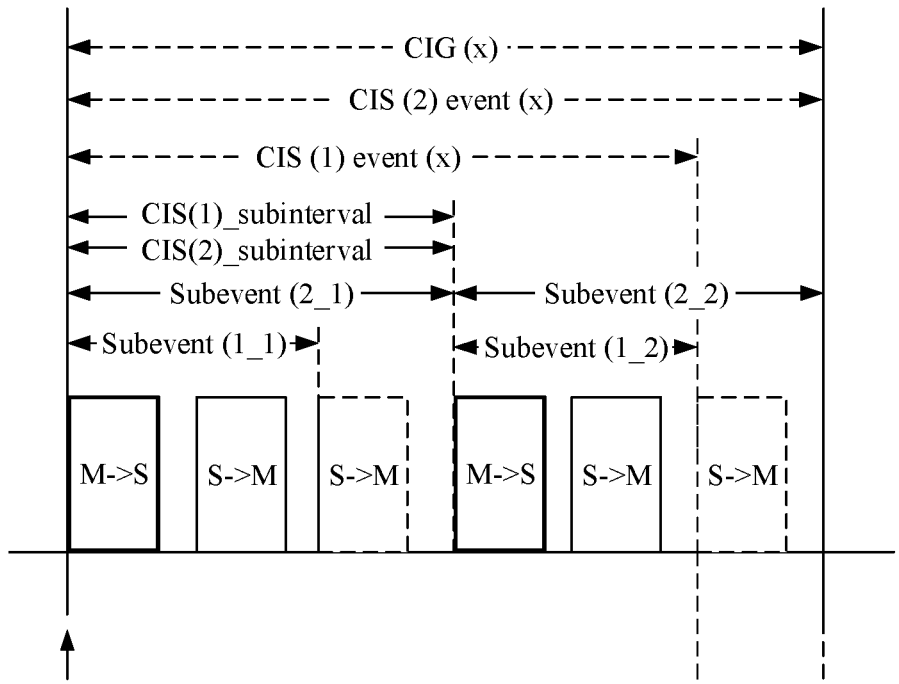
FIG. 14 is a schematic diagram of a principle of a joint scheduling transmission manner according to an embodiment of this application.
Figure 14:
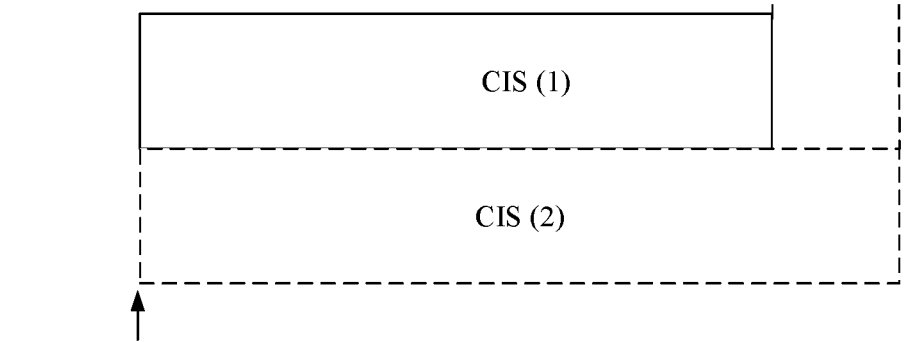

For example, if the mobile phone 100 determines that the TWS headset 101 is in the double-earbud mode, the mobile phone 100 may configure the first CIG, and configure the joint scheduling transmission manner shown in (a) in FIG. 14 for the CIS (1) and the CIS (2). Specifically, as shown in (a) in FIG. 14 or (b) in FIG. 14, an anchor point of the CIS (1) (for example, a CIS (1).x anchor point) is an anchor point of the first CIG (for example, a CIG (x) anchor point), and an anchor point of the CIS (2) (for example, a CIS (2).x anchor point) is also the anchor point of the first CIG. In addition, as shown in (a) in FIG. 14, a subinterval of the CIS (1) (for example, a CIS(1)_subinterval) is the same as a subinterval of the CIS (2) (for example, a CIS(2)_subinterval).

Then, the mobile phone 100 may create the CIS (1) for the earbud 101-1, and create the CIS (2) for the earbud 101-2. Finally, the mobile phone 100 may indicate the earbud 101-1 to activate the CIS (1), and indicate the earbud 101-2 to activate the CIS (2). After the CIS (1) and the CIS (2) are activated, the mobile phone 100 may transmit audio data to the earbuds 101-1 and 101-2 in the joint scheduling transmission manner shown in (a) in FIG. 14.

In the double-earbud mode, a method for transmitting audio data between the mobile phone 100 and the earbuds 101-1 and 101-2 in the joint scheduling transmission manner shown in (a) in FIG. 14 may include the following processes (1) to (6).

Process (1): The mobile phone 100 starts to send audio data (for example, an audio data packet 1) from the CIS (1).x anchor point (namely, the CIS (2).x anchor point) by using an "M→S" of a subevent (1_1) of a CIS (1) event (x) and an "M→S" of a subevent (2_1) of a CIS (2) event (x) (that is, the "M→S" in bold in (a) in FIG. 14) in a frequency hopping manner. The earbud 101-1 may receive, by using the "M→S" of the subevent (1_1) (that is, the "M→S" in bold) shown in (a) in FIG. 14 in the frequency hopping manner, the audio data packet 1 sent by the mobile phone

100. The earbud 101-2 may receive, by using the "M→S" of the subevent (2_1) (that is, the "M→S" in bold) shown in (a) in FIG. 14 in the frequency hopping manner, the audio data packet 1 sent by the mobile phone 100.

Process (2): The earbud 101-1 may send first data to the mobile phone 100 by using an "S→M" of the subevent (1_1) (the "S→M" shown as a non-bold solid box). The mobile phone 100 may receive, by using the "S→M" of the subevent (1_1), the first data sent by the earbud 101-1.

Process (3): The earbud 101-2 may send third data to the mobile phone 100 by using an "S→M" of the subevent (2_1) (the "S→M" shown as a dashed box). The mobile phone 100 receives, by using the "S→M" of the subevent (2_1), the third data sent by the earbud 101-2.

Process (4): The mobile phone 100 sends audio data (for example, an audio data packet 2) by using an "M→S" of a subevent (1_2) and "M→S" of a subevent (2_2) (that is, the "M→S" in bold) in the frequency hopping manner. The earbud 101-1 may receive, by using the "M→S" of the subevent (1_2) shown in (a) in FIG. 14 in the frequency hopping manner, the audio data packet 2 sent by the mobile phone 100. The earbud 101-2 may receive, by using the "M→S" of the subevent (2_2) shown in (a) in FIG. 14 in the frequency hopping manner, the audio data packet 2 sent by the mobile phone 100.

Process (5): The earbud 101-1 may send second data to the mobile phone 100 by using an "S→M" of the subevent (1_2) (the "S→M" shown as anon-bold solid box). The mobile phone 100 may receive, by using the "S→M" of the subevent (1_2), the second data sent by the earbud 101-1.

Process (6): The earbud 101-2 may send fourth data to the mobile phone 100 by using an "S→M" of the subevent (2_2) (the "S→M" shown as a dashed box). The mobile phone 100 receives, by using the "S→M" of the subevent (2_2), the fourth data sent by the earbud 101-2.

If the TWS headset 101 is switched from the double-earbud mode to the single-earbud mode (for example, in the single-earbud mode in which the earbud 101-2 is used but the earbud 101-1 is not used), the mobile phone 100 may deactivate the CIS (1). After the CIS (1) is deactivated, the mobile phone 100 may stop transmitting audio data to the earbud 101-1 by using the CIS (1). In addition, the mobile phone 100 may continue transmitting audio data to the earbud 101-2 by using the CIS (2) in the joint scheduling transmission manner shown in (a) in FIG. 14.

Specifically, after the TWS headset 101 is switched to the single-earbud mode, the method for transmitting audio data between the mobile phone 100 and the earbud 101-2 in the joint scheduling transmission manner shown in (a) in FIG. 14 may include the foregoing processes (1), (3), (4), and (6), but not include the foregoing processes (2) and (5). In addition, in the processes (1) and (4), the earbud 101-1 does not receive, by using the "M→S" (that is, the "M→S" in bold) shown in (a) in FIG. 14 in the frequency hopping manner, the audio data packet sent by the mobile phone 100.

In this embodiment of this application, the mobile phone 100 may send an audio data packet at a same time point (namely, the CIS (1).x anchor point or the CIS (2).x anchor point, where the CIS (1).x anchor point is the same as the CIS (2).x anchor point) in the frequency hopping manner. In this way, the left and right earbuds of the TWS headset 201 may also receive the audio data packet by using a same "M→S" in the frequency hopping manner. In this case, the mobile phone 100 does not repeatedly transmit same audio data in different time periods. Therefore, wastes of transmission resources can be reduced, and effective transmission resource utilization can be improved.

Some other embodiments of this application further provide an electronic device. The electronic device may include one or more processors, a memory, and one or more computer programs. The foregoing components may be connected through one or more communications buses. The one or more computer programs are stored in the memory and configured to be executed by the one or more processors. The one or more computer programs include instructions, and the instructions may be used to implement the functions or steps performed by the mobile phone 100 in the description corresponding to any one of FIG. 8, FIG. 9A and FIG. 9B, FIG. 10, FIG. 11, FIG. 12, FIG. 13, or FIG. 14. For a structure of the electronic device, refer to the structure of the electronic device 100 shown in FIG. 6A.

The foregoing descriptions about implementations allow a person skilled in the art to clearly understand that, for the purpose of convenient and brief description, division into the foregoing functional modules is merely used as an example for description. In an actual application, the foregoing functions may be allocated to different functional modules for implementation based on a requirement. In other words, an inner structure of an apparatus is divided into different functional modules to implement all or some of the functions described above. For a detailed working process of the foregoing system, apparatus, and units, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments. The foregoing storage medium includes any medium that can store program code, such as a flash memory, a removable hard disk, a read-only memory, a random access memory, a magnetic disk, or a compact disc.

The foregoing descriptions are merely specific implementations of the embodiments, but are not intended to limit the protection scope of the embodiments. Any variation or replacement within the technical scope disclosed in the embodiments shall fall within the protection scope of the embodiments. Therefore, the protection scope of the embodiments shall be subject to the protection scope of the claims.

What is claimed is:

1. An audio data transmission method, wherein the method is used for audio data transmission between an electronic device and a true wireless stereo (TWS) headset, the TWS headset comprises a first earbud and a second earbud, and the method comprises:
   transmitting, by the electronic device, audio data to the first earbud by using a first connected isochronous stream (CIS) of a first connected isochronous group (CIG), and transmitting, by the electronic device, audio data to the second earbud by using a second CIS of the first CIG;
   determining, by the electronic device, that the TWS headset is switched from a double-earbud mode to a first single-earbud mode, wherein the double-earbud mode is a mode in which the first earbud and the second earbud are used together as audio input/output devices of the electronic device, and the first single-earbud mode is a mode in which the first earbud is independently used as an audio input/output device of the electronic device; and
   in response to the determining, deactivating, by the electronic device, the second CIS, stopping transmitting audio data to the second earbud by using the second CIS, and continuing transmitting audio data to the first earbud by using the first CIS.

2. The method according to claim 1, wherein after the step of in response to the determining, deactivating, by the electronic device, the second CIS, stopping transmitting audio data to the second earbud by using the second CIS, and continuing transmitting audio data to the first earbud by using the first CIS, the method further comprises:
   determining, by the electronic device, that the TWS headset is switched from the first single-earbud mode to the double-earbud mode; and
   in response to determining that the TWS headset is switched from the first single-earbud mode to the double-earbud mode, continuing transmitting, by the electronic device, audio data to the first earbud by using the first CIS, activating the second CIS, and transmitting audio data to the second earbud by using the second CIS.

3. The method according to claim 2, wherein after the step of in response to determining that the TWS headset is switched from the first single-earbud mode to the double-earbud mode, continuing transmitting, by the electronic device, audio data to the first earbud by using the first CIS, activating the second CIS, and transmitting audio data to the second earbud by using the second CIS, the method further comprises:
   determining, by the electronic device, that the TWS headset is switched from the double-earbud mode to a second single-earbud mode, wherein the second single-earbud mode is a mode in which the second earbud is independently used as an audio input/output device of the electronic device; and
   in response to determining that the TWS headset is switched from the double-earbud mode to the second single-earbud mode, deactivating, by the electronic device, the first CIS, stopping transmitting audio data to the first earbud by using the first CIS, and continuing transmitting audio data to the second earbud by using the second CIS.

4. The method according to claim 1, wherein before the transmitting, by the electronic device, audio data to the first earbud by using a first CIS of a first CIG, the method further comprises:
   determining, by the electronic device, that the TWS headset is in the double-earbud mode;
   configuring, by the electronic device, the first CIG for the TWS headset, wherein the first CIG comprises the first CIS and the second CIS;
   configuring, by the electronic device, the first CIS for the first earbud, and configuring the second CIS for the second earbud; and
   activating, by the electronic device, the first CIS and the second CIS.

5. The method according to claim 1, wherein when the TWS headset is in the double-earbud mode, and the electronic device configures the first CIG, an anchor point of the first CIS is a CIG anchor point of the first CIG, an anchor point of the second CIS is the same as an end point of the first subevent in a CIS event of the first CIS, and a start point of the second subevent of the first CIS is an end point of the first subevent of the second CIS;
   the first CIS and the second CIS each comprise a plurality of CIS events; the first CIG comprises a plurality of CIG events; each CIG event comprises one CIS event of the first CIS and one CIS event of the second CIS; each CIS event of the first CIS comprises N1 subevents, wherein N1 is greater than or equal to 2; and each CIS event of the second CIS comprises N2 subevents, wherein N2 is greater than or equal to 2; and
   the electronic device starts to transmit audio data to the first earbud from the anchor point of the first CIS by using the first CIS, and the electronic device starts to transmit audio data to the second earbud from the anchor point of the second CIS by using the second CIS.

6. The method according to claim 1, wherein when the TWS headset is in the double-earbud mode, and the electronic device configures the first CIG, an anchor point of the first CIS is a CIG anchor point of the first CIG, and an anchor point of the second CIS is also the CIG anchor point of the first CIG;
   the first CIG comprises a plurality of CIG events; and the CIG anchor point of the first CIG is a start time point of the CIG event; and
   the electronic device starts to transmit audio data to the first earbud from the anchor point of the first CIS by using the first CIS, and the electronic device starts to transmit audio data to the second earbud from the anchor point of the second CIS by using the second CIS.

7. The method according to claim 1, wherein after the determining, by the electronic device, that the TWS headset is switched from a double-earbud mode to a first single-earbud mode, the method further comprises:

receiving, by the electronic device, a suspending operation of a user, wherein the suspending operation is used to trigger the TWS headset to temporarily stop playing audio data;

in response to the suspending operation, determining, by the electronic device, that the TWS headset is currently in the first single-earbud mode, and reconfiguring a first CIG for the TWS headset, wherein the reconfigured first CIG comprises a reconfigured first CIS and a reconfigured second CIS; and configuring, by the electronic device, the reconfigured first CIS for the first earbud, activating the reconfigured first CIS, starting to transmit audio data to the first earbud from an anchor point of the reconfigured first CIS by using the reconfigured first CIS, wherein the reconfigured second CIS is not activated in the first single-earbud mode.

8. The method according to claim 7, wherein when the TWS headset is currently in the first single-earbud mode, and the electronic device configures the reconfigured first CIG, the anchor point of the reconfigured first CIS is a CIG anchor point of the reconfigured first CIG, and an anchor point of the reconfigured second CIS is the same as an end point of a CIS event of the reconfigured first CIS;

the reconfigured first CIS and the reconfigured second CIS each comprise a plurality of CIS events; the reconfigured first CIG comprises a plurality of CIG events; each CIG event comprises one CIS event of the reconfigured first CIS and one CIS event of the reconfigured second CIS; and the CIG anchor point of the reconfigured first CIG is a start time point of the CIG event; and the electronic device starts to transmit audio data to the first earbud from the anchor point of the reconfigured first CIS by using the reconfigured first CIS, and the electronic device starts to transmit audio data to the second earbud from the anchor point of the reconfigured second CIS by using the reconfigured second CIS.

9. An audio data transmission method, wherein the method is used for audio data transmission between an electronic device and a true wireless stereo (TWS) headset, the TWS headset comprises a first earbud and a second earbud, and the method comprises:

determining, by the electronic device, that the TWS headset is in a first single-earbud mode, wherein the first single-earbud mode is a mode in which the first earbud is independently used as an audio input/output device of the electronic device;

in response to the determining, configuring, by the electronic device, a first connected isochronous group (CIG) for the first earbud, wherein the first CIG comprises a first connected isochronous stream (CIS) and a second CIS; and configuring, by the electronic device, the first CIS for the first earbud, activating the first CIS, and transmitting audio data to the first earbud by using the first CIS, wherein the second CIS is in an inactive state in the first single-earbud mode.

10. The method according to claim 9, wherein after the configuring, by the electronic device, the first CIS for the first earbud, activating the first CIS, and transmitting audio data to the first earbud by using the first CIS, the method further comprises:

determining, by the electronic device, that the TWS headset is switched from the first single-earbud mode to a double-earbud mode, wherein the double-earbud mode is a mode in which the first earbud and the second earbud are used together as audio input/output devices of the electronic device; and in response to determining that the TWS headset is switched from the first single-earbud mode to the double-earbud mode, activating, by the electronic device, the second CIS, transmitting audio data to the second earbud by using the second CIS, and continuing transmitting audio data to the first earbud by using the first CIS.

11. The method according to claim 10, wherein after the step of in response to determining that the TWS headset is switched from the first single-earbud mode to the double-earbud mode, activating, by the electronic device, the second CIS, transmitting audio data to the second earbud by using the second CIS, and continuing transmitting audio data to the first earbud by using the first CIS, the method further comprises:

determining, by the electronic device, that the TWS headset is switched from the double-earbud mode to a second single-earbud mode, wherein the second single-earbud mode is a mode in which the second earbud is independently used as an audio input/output device of the electronic device; and in response to determining that the TWS headset is switched from the double-earbud mode to the second single-earbud mode, deactivating, by the electronic device, the first CIS, stopping transmitting audio data to the first earbud by using the first CIS, and continuing transmitting audio data to the second earbud by using the second CIS.

12. The method according to claim 10, wherein after the step of in response to determining that the TWS headset is switched from the first single-earbud mode to the double-earbud mode, activating, by the electronic device, the second CIS, transmitting audio data to the second earbud by using the second CIS, and continuing transmitting audio data to the first earbud by using the first CIS, the method further comprises:

receiving, by the electronic device, a suspending operation of a user, wherein the suspending operation is used to trigger the TWS headset to temporarily stop playing audio data;

in response to the suspending operation, determining, by the electronic device, that the TWS headset is currently in the double-earbud mode, and reconfiguring a first CIG for the TWS headset, wherein the reconfigured first CIG comprises a reconfigured first CIS and a reconfigured second CIS;

configuring, by the electronic device, the reconfigured first CIS for the first earbud, and configuring the reconfigured second CIS for the second earbud;

activating, by the electronic device, the reconfigured first CIS and the reconfigured second CIS; and transmitting, by the electronic device, audio data to the first earbud by using the reconfigured first CIS, and transmitting audio data to the second earbud by using the reconfigured second CIS.

13. The method according to claim 12, wherein when the TWS headset is currently in the double-earbud mode, and the electronic device configures the reconfigured first CIG, an anchor point of the reconfigured first CIS is a CIG anchor point of the reconfigured first CIG, an anchor point of the reconfigured second CIS is the same as an end point of the first subevent in a CIS event of the reconfigured first CIS, and a start point of the second subevent of the reconfigured first CIS is an end point of the first subevent of the reconfigured second CIS;

wherein the reconfigured first CIS and the reconfigured second CIS each comprise a plurality of CIS events; the reconfigured first CIG comprises a plurality of CIG events; each CIG event comprises one CIS event of the reconfigured first CIS and one CIS event of the reconfigured second CIS; each CIS event of the reconfigured first CIS comprises N1 subevents, wherein N1 is greater than or equal to 2; and each CIS event of the reconfigured second CIS comprises N2 subevents, wherein N2 is greater than or equal to 2; and wherein the electronic device starts to transmit audio data to the first earbud from the anchor point of the reconfigured first CIS by using the reconfigured first CIS, and the electronic device starts to transmit audio data to the second earbud from the anchor point of the reconfigured second CIS by using the reconfigured second CIS.

14. The method according to claim 12, wherein when the TWS headset is in the double-earbud mode, and the electronic device configures the reconfigured first CIG, an anchor point of the reconfigured first CIS is a CIG anchor point of the reconfigured first CIG, and an anchor point of the reconfigured second CIS is also the CIG anchor point of the reconfigured first CIG;

wherein the reconfigured first CIG comprises a plurality of CIG events, and the CIG anchor point of the reconfigured first CIG is a start time point of the CIG event; and wherein the electronic device starts to transmit audio data to the first earbud from the anchor point of the reconfigured first CIS by using the reconfigured first CIS, and the electronic device starts to transmit audio data to the second earbud from the anchor point of the reconfigured second CIS by using the reconfigured second CIS.

15. The method according to claim 9, wherein when the TWS headset is in the first single-earbud mode or the second single-earbud mode, an anchor point of the first CIS is a CIG anchor point of the first CIG, an anchor point of the second CIS is the same as an end point of a CIS event of the first CIS, and the second single-earbud mode is a mode in which the second earbud is independently used as an audio input/output device of the electronic device;

wherein the first CIS and the second CIS each comprise a plurality of CIS events; the first CIG comprises a plurality of CIG events; each CIG event comprises one CIS event of the first CIS and one CIS event of the second CIS; and the CIG anchor point of the first CIG is a start time point of the CIG event; and wherein the electronic device starts to transmit audio data to the first earbud from the anchor point of the first CIS by using the first CIS, and the electronic device starts to transmit audio data to the second earbud from the anchor point of the second CIS by using the second CIS.

16. An electronic device, comprising one or more processors, a memory, and a wireless transceiver, wherein:
the memory and the wireless transceiver are coupled to the one or more processors, the memory is configured to store computer program code, the computer program code comprises computer instructions, and when the one or more processors execute the computer instructions, the electronic device is configured for:
transmitting audio data to a first earbud of a true wireless stereo (TWS) headset by using a first connected isochronous stream (CIS) of a first connected isochronous group (CIG), and transmitting audio data to a second earbud of the TWS headset by using a second CIS of the first CIG;

determining that the TWS headset is switched from a double-earbud mode to a first single-earbud mode, wherein the double-earbud mode is a mode in which the first earbud and the second earbud are used together as audio input/output devices of the electronic device, and the first single-earbud mode is a mode in which the first earbud is independently used as an audio input/output device of the electronic device; and in response to the determining, deactivating the second CIS, stopping transmitting audio data to the second earbud by using the second CIS, and continuing transmitting audio data to the first earbud by using the first CIS.

17. The electronic device according to claim 16, wherein after the step of in response to the determining, deactivating the second CIS, stopping transmitting audio data to the second earbud by using the second CIS, and continuing transmitting audio data to the first earbud by using the first CIS, the electronic device is further configured for:
determining that the TWS headset is switched from the first single-earbud mode to the double-earbud mode; and
in response to determining that the TWS headset is switched from the first single-earbud mode to the double-earbud mode, continuing transmitting audio data to the first earbud by using the first CIS, activating the second CIS, and transmitting audio data to the second earbud by using the second CIS.

18. The electronic device according to claim 17, wherein after the step of in response to determining that the TWS headset is switched from the first single-earbud mode to the double-earbud mode, continuing transmitting audio data to the first earbud by using the first CIS, activating the second CIS, and transmitting audio data to the second earbud by using the second CIS, the electronic device is further configured for:
determining that the TWS headset is switched from the double-earbud mode to a second single-earbud mode, wherein the second single-earbud mode is a mode in which the second earbud is independently used as an audio input/output device of the electronic device; and
in response to determining that the TWS headset is switched from the double-earbud mode to the second single-earbud mode, deactivating the first CIS, stopping transmitting audio data to the first earbud by using the first CIS, and continuing transmitting audio data to the second earbud by using the second CIS.

19. The electronic device according to claim 16, wherein before the transmitting audio data to the first earbud by using a first CIS of a first CIG, the electronic device is further configured for:
determining that the TWS headset is in the double-earbud mode;
configuring the first CIG for the TWS headset, wherein the first CIG comprises the first CIS and the second CIS;
configuring the first CIS for the first earbud, and configuring the second CIS for the second earbud; and
activating the first CIS and the second CIS.

20. The electronic device according to claim 16, wherein when the TWS headset is in the double-earbud mode, and the electronic device configures the first CIG, an anchor point of the first CIS is a CIG anchor point of the first CIG, an anchor point of the second CIS is the same as an end point of the first subevent in a CIS event of the first CIS, and a start point of the second subevent of the first CIS is an end point of the first subevent of the second CIS;

wherein the first CIS and the second CIS each comprise a plurality of CIS events; the first CIG comprises a plurality of CIG events; each CIG event comprises one CIS event of the first CIS and one CIS event of the second CIS; each CIS event of the first CIS comprises N1 subevents, wherein N1 is greater than or equal to 2; and each CIS event of the second CIS comprises N2 subevents, wherein N2 is greater than or equal to 2; and wherein the electronic device starts to transmit audio data to the first earbud from the anchor point of the first CIS by using the first CIS, and the electronic device starts to transmit audio data to the second earbud from the anchor point of the second CIS by using the second CIS.

\* \* \* \* \*